(12) United States Patent
Nishihara

(10) Patent No.: US 10,158,813 B2
(45) Date of Patent: Dec. 18, 2018

(54) IMAGE PICKUP DEVICE, ELECTRONIC APPARATUS, RADIATION DETECTION APPARATUS AND METHOD FOR AN IMAGE PICKUP DEVICE

(71) Applicant: SONY SEMICONDUCTOR SOLUTIONS CORPORATION, Kanagawa (JP)

(72) Inventor: Toshiyuki Nishihara, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/311,940

(22) PCT Filed: May 29, 2015

(86) PCT No.: PCT/JP2015/002732
§ 371 (c)(1),
(2) Date: Nov. 17, 2016

(87) PCT Pub. No.: WO2016/006153
PCT Pub. Date: Jan. 14, 2016

(65) Prior Publication Data
US 2017/0134677 A1     May 11, 2017

(30) Foreign Application Priority Data
Jul. 8, 2014   (JP) .................................. 2014-140109

(51) Int. Cl.
*G01T 1/202*  (2006.01)
*H04N 5/361*  (2011.01)
(Continued)

(52) U.S. Cl.
CPC ............. *H04N 5/361* (2013.01); *G01T 1/202* (2013.01); *G01T 1/208* (2013.01); *H04N 5/3559* (2013.01);
(Continued)

(58) Field of Classification Search
CPC ................................................ H01L 27/14609
See application file for complete search history.

(56) References Cited

U.S. PATENT DOCUMENTS 6,992,341 B2 * 1/2006 Watanabe ......... H01L 27/14609
257/292
8,269,873 B2 * 9/2012 Koseki ................. H04N 5/3658
348/308
(Continued)

FOREIGN PATENT DOCUMENTS

EP   1 560 420 A2   8/2005
EP   2 330 625 A2   6/2011
(Continued)

OTHER PUBLICATIONS

International Search Report and Written Opinion prepared by the Japan Patent Office dated Sep. 11, 2015, for International Application No. PCT/JP2015/002732.

(Continued)

*Primary Examiner* — Marcus Taningco
*Assistant Examiner* — Djura Malevic
(74) *Attorney, Agent, or Firm* — Sheridan Ross P.C.

(57) ABSTRACT

An image pickup device including an amplification transistor (136) and a photodiode (134) is provided. The photodiode is configured to generate an electric charge and provide the electric charge to a first terminal of the amplification transistor. The image pickup device also includes a selection transistor (131) having a first terminal electrically connected to a second terminal of the amplification transistor and a second terminal of the selection transistor electrically connected to a signal line (129) is provided. In particular, a third terminal of the amplification transistor is electrically connected to a ground potential.

19 Claims, 16 Drawing Sheets

(51) Int. Cl.
*H04N 5/355* (2011.01)
*H04N 5/357* (2011.01)
*H04N 5/374* (2011.01)
*H04N 5/3745* (2011.01)
*G01T 1/208* (2006.01)

(52) U.S. Cl.
CPC ......... *H04N 5/3575* (2013.01); *H04N 5/3741* (2013.01); *H04N 5/37457* (2013.01)

(56) References Cited

U.S. PATENT DOCUMENTS

| | | |
|---|---|---|
| 2001/0005224 A1 | 6/2001 | Lee |
| 2005/0161712 A1* | 7/2005 | Koyama ................ H04N 3/155 257/292 |
| 2005/0212937 A1* | 9/2005 | Koyama ............ H04N 5/37457 348/301 |
| 2006/0208291 A1* | 9/2006 | Koizumi ........... H01L 27/14603 257/292 |
| 2006/0221667 A1* | 10/2006 | Ogura ............... H01L 27/14625 365/149 |
| 2006/0232580 A1* | 10/2006 | Koyama .............. H04N 5/3591 345/211 |
| 2008/0185502 A1 | 8/2008 | Koyama |
| 2010/0230579 A1* | 9/2010 | Watanabe ......... H01L 27/14609 250/208.1 |
| 2010/0243866 A1 | 9/2010 | Mo et al. |
| 2010/0265373 A1* | 10/2010 | Tejada ................... H04N 5/235 348/297 |
| 2013/0214128 A1* | 8/2013 | Yamashita ........ H01L 27/14609 250/208.1 |
| 2015/0028335 A1* | 1/2015 | Kurokawa ........... A61B 6/4208 257/43 |

FOREIGN PATENT DOCUMENTS

| | | |
|---|---|---|
| JP | 2002-055170 | 2/2002 |
| JP | 2005-167579 | 6/2005 |
| JP | 2010-063096 | 3/2010 |
| JP | 2011-188410 | 9/2011 |

OTHER PUBLICATIONS

Official Action (no English translation available) for Application No. JP 2014-140109 from the Japanese Patent Office dated Dec. 19, 2017, 9 pages.

* cited by examiner

[Fig. 1]
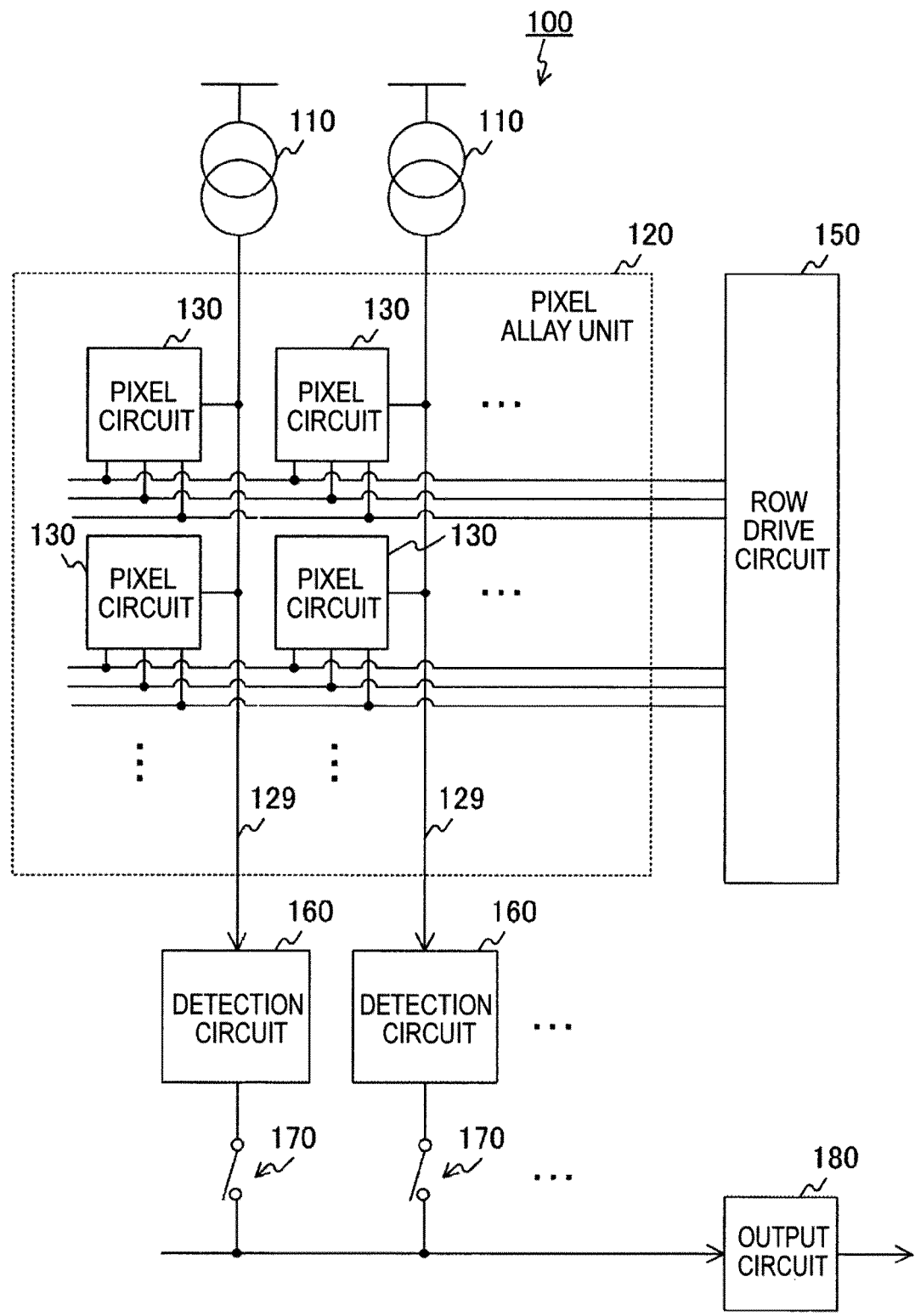

[Fig. 2]
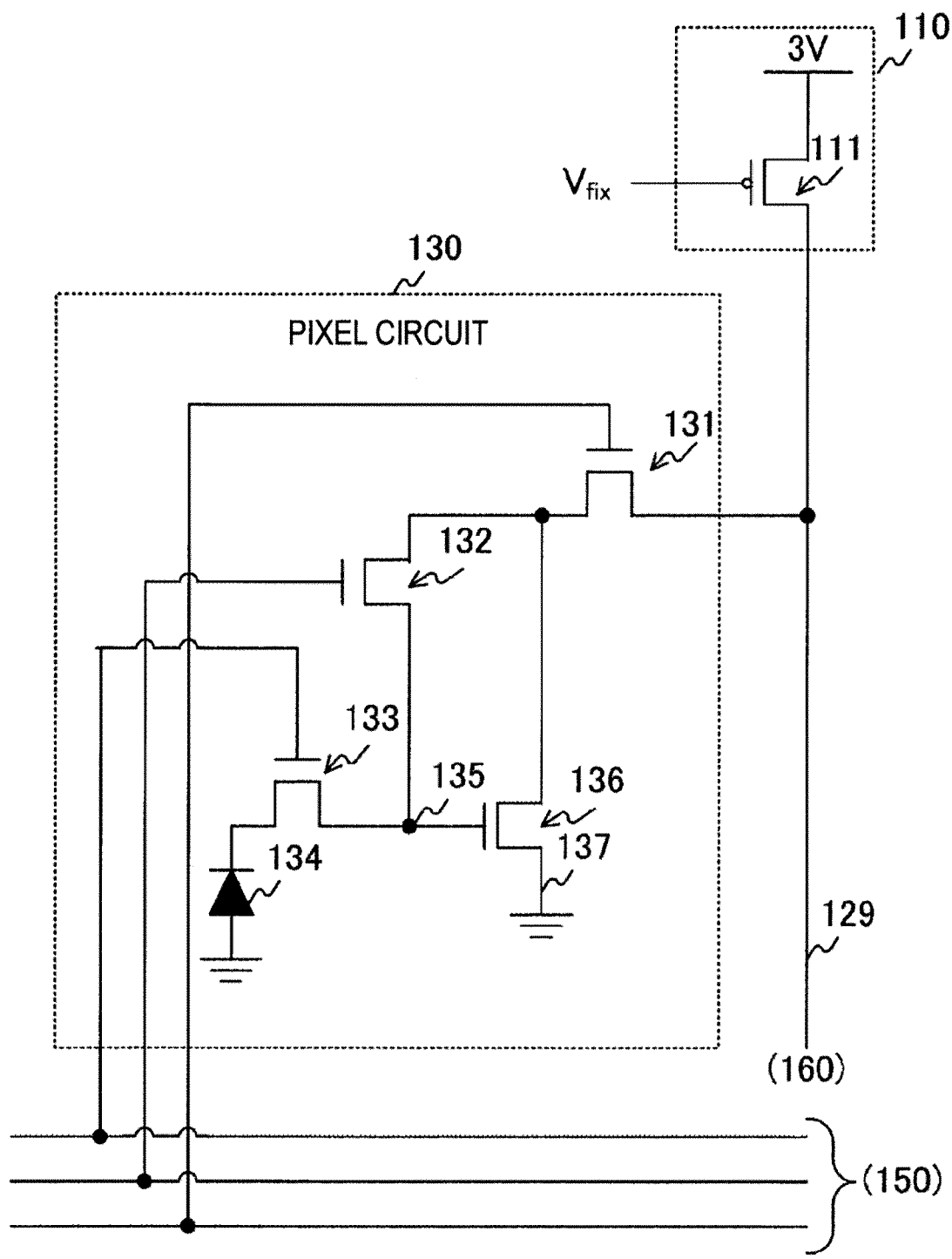

[Fig. 3]
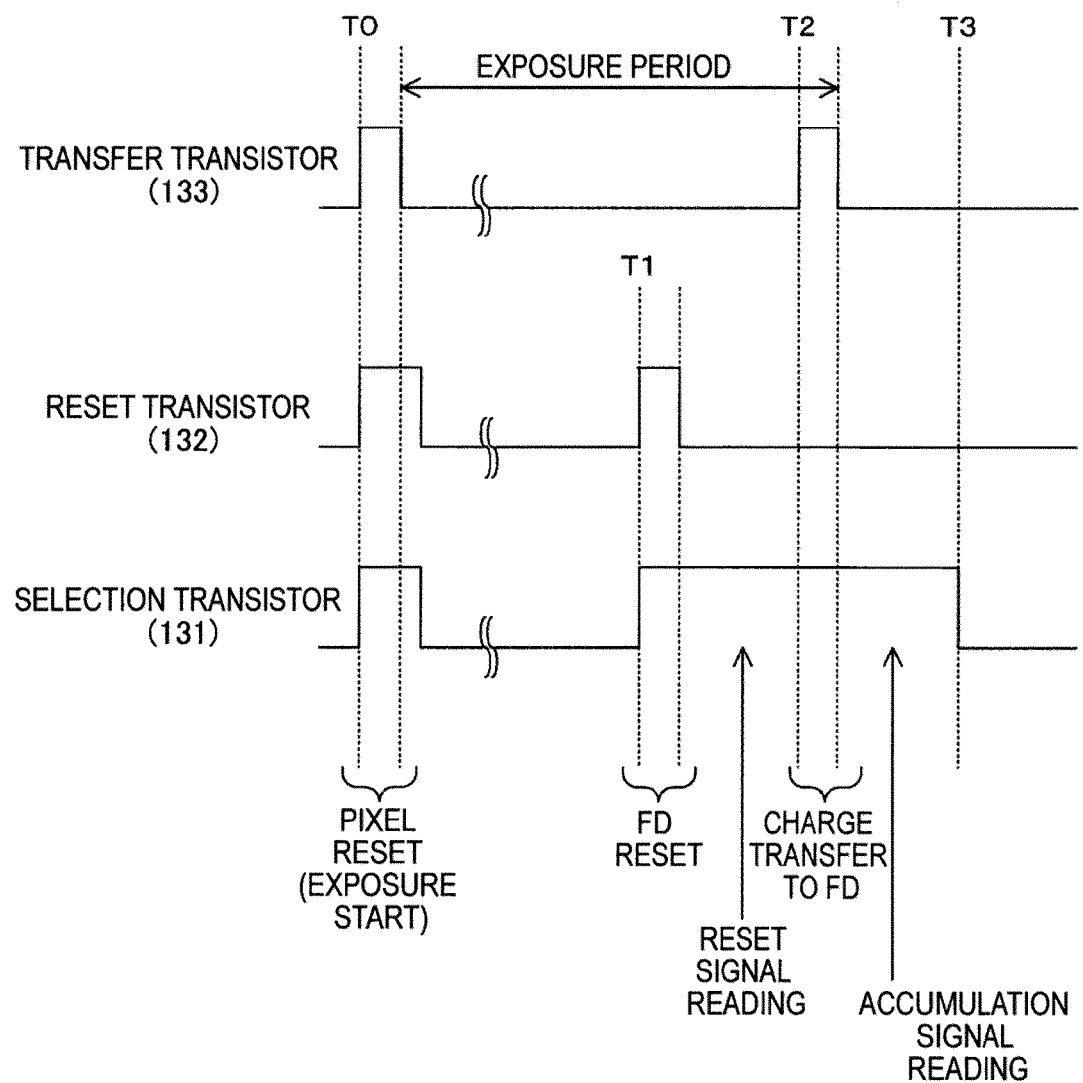

[Fig. 4]
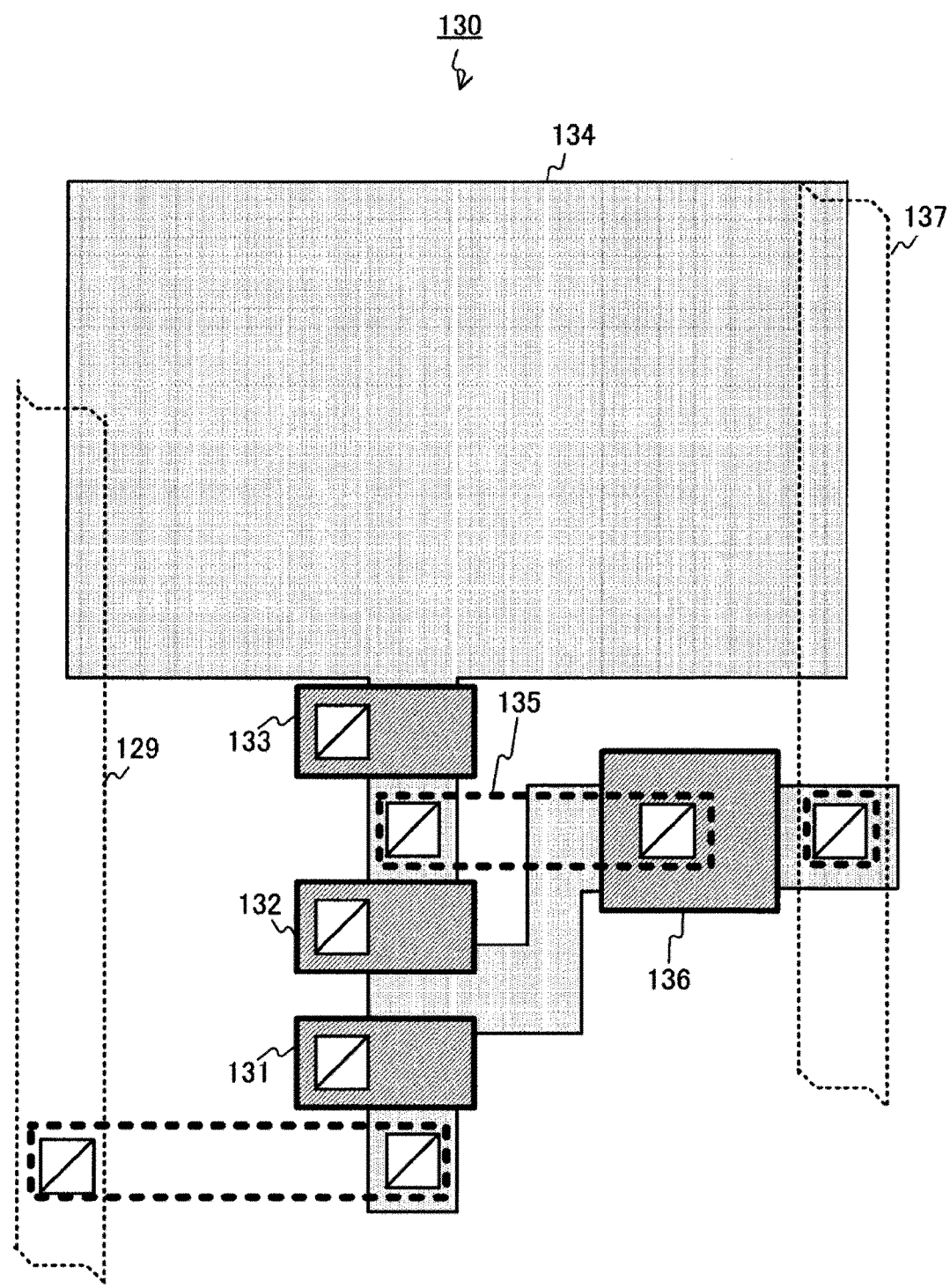

[Fig. 5]
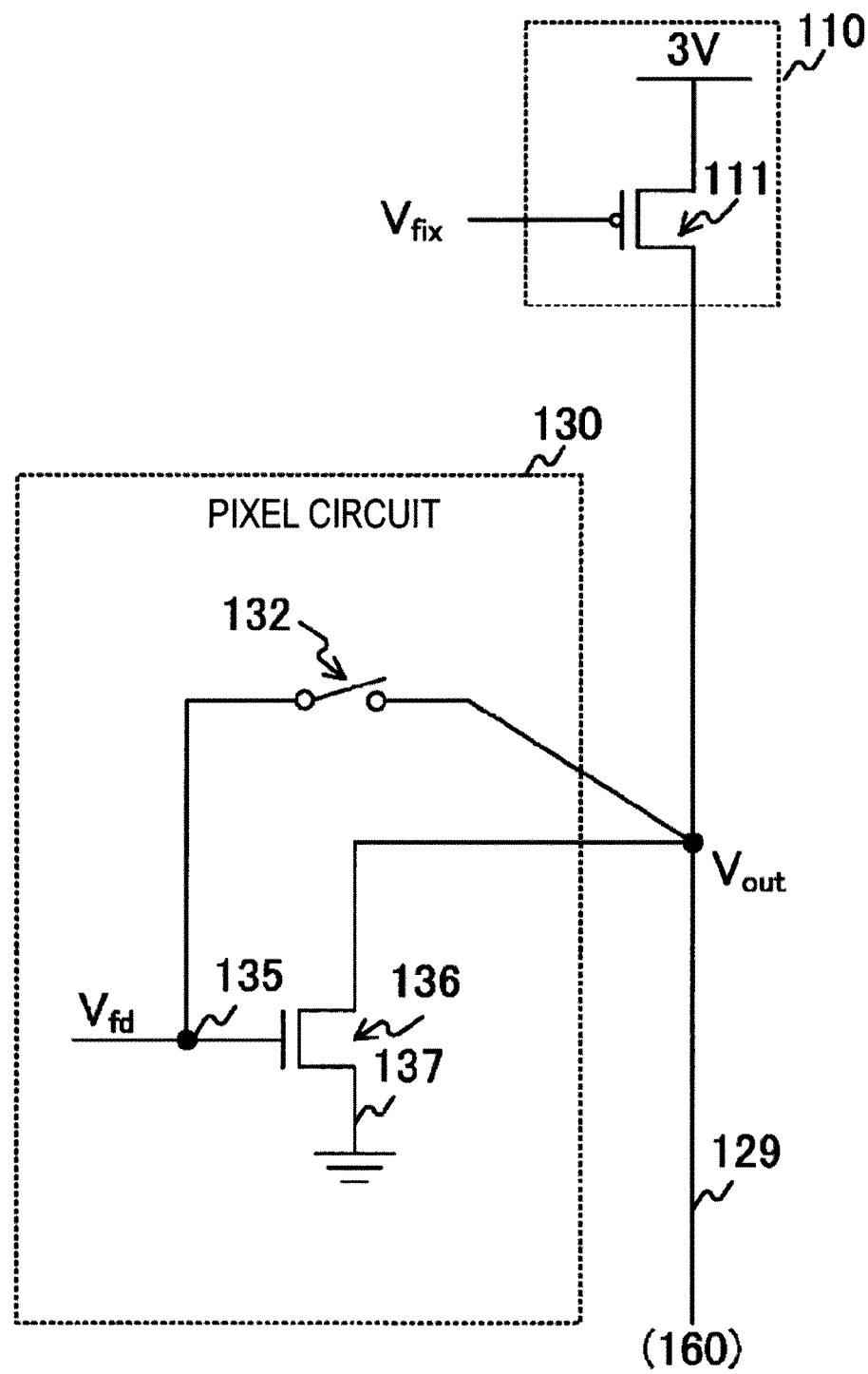

[Fig. 6]
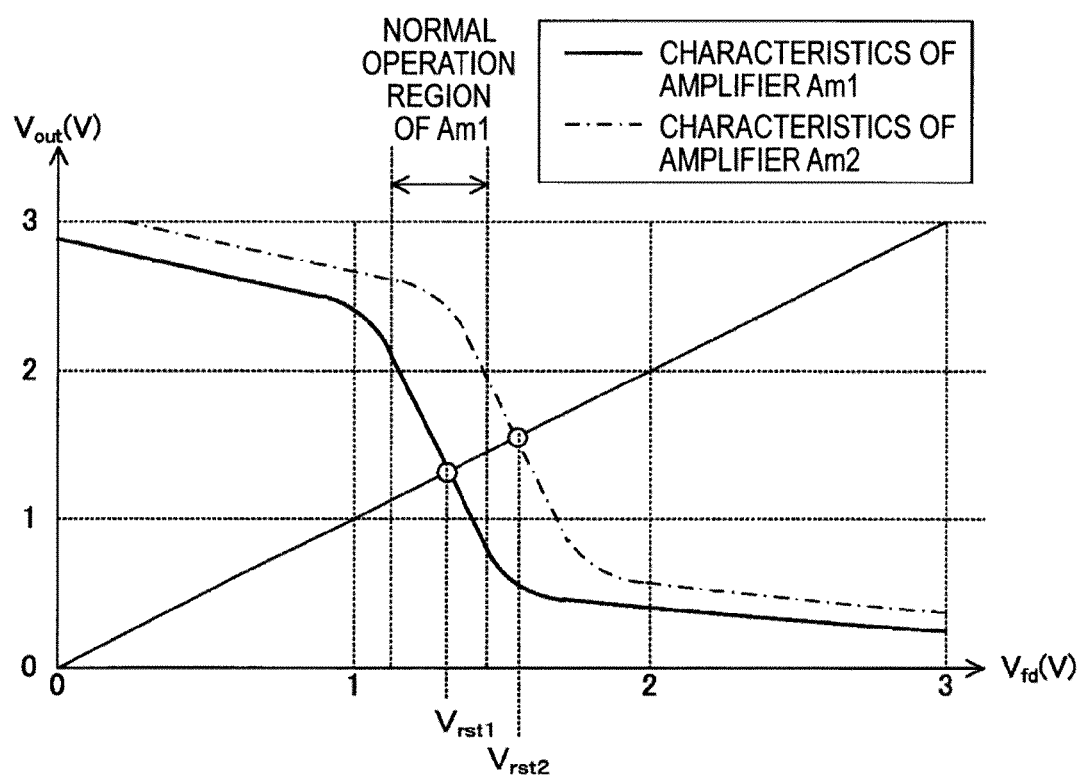

[Fig. 7]
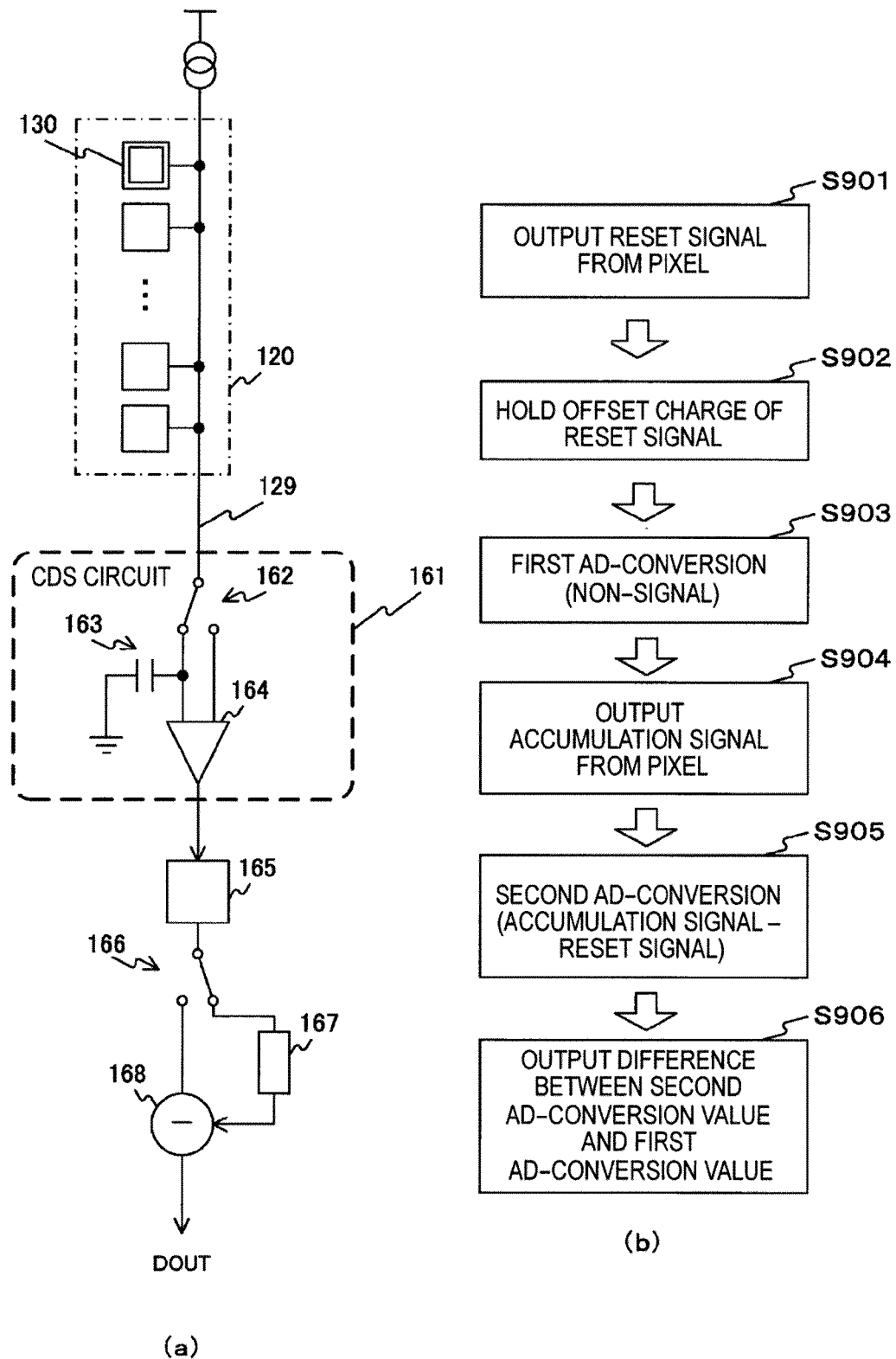

[Fig. 8]
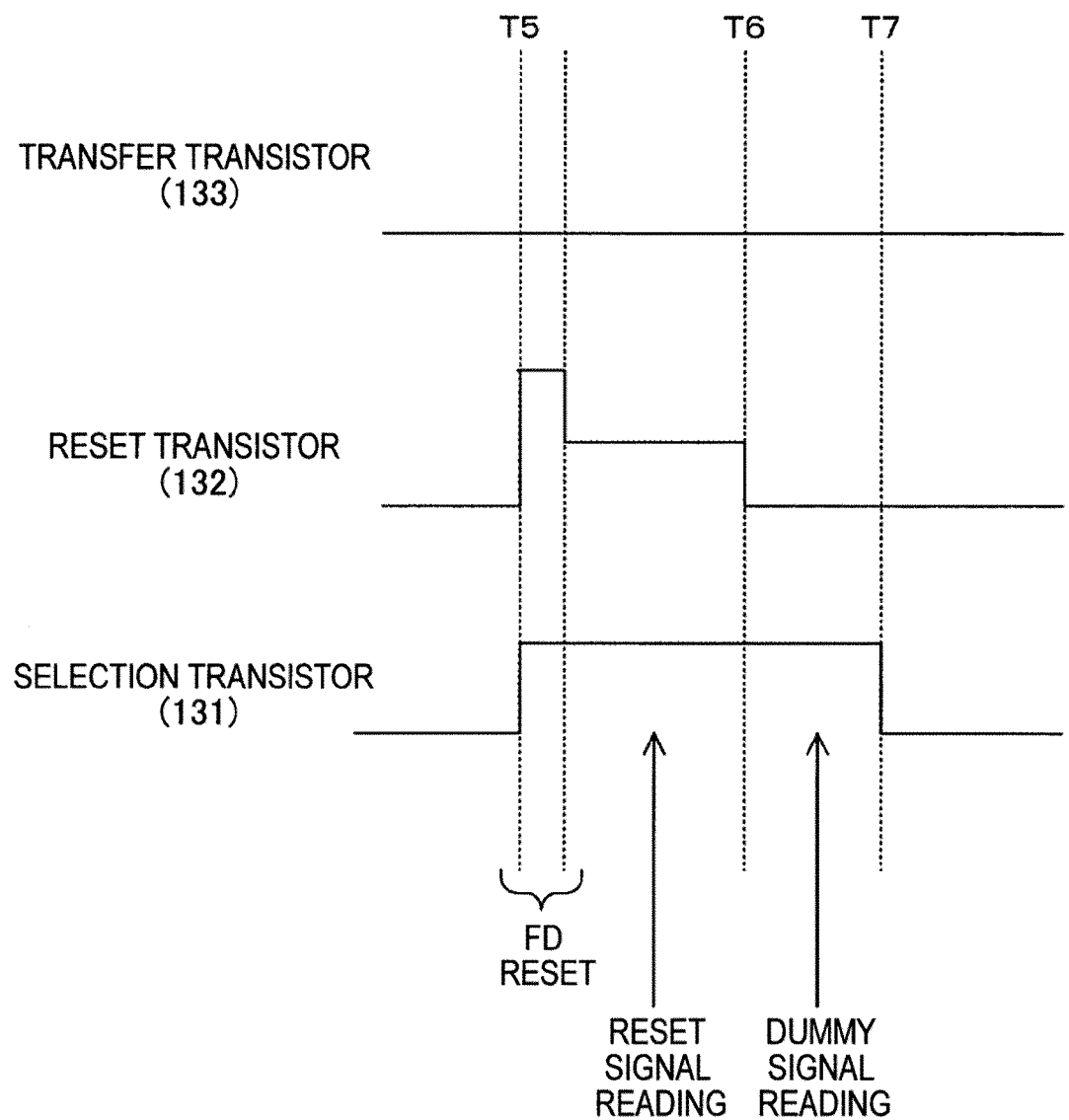

[Fig. 9]
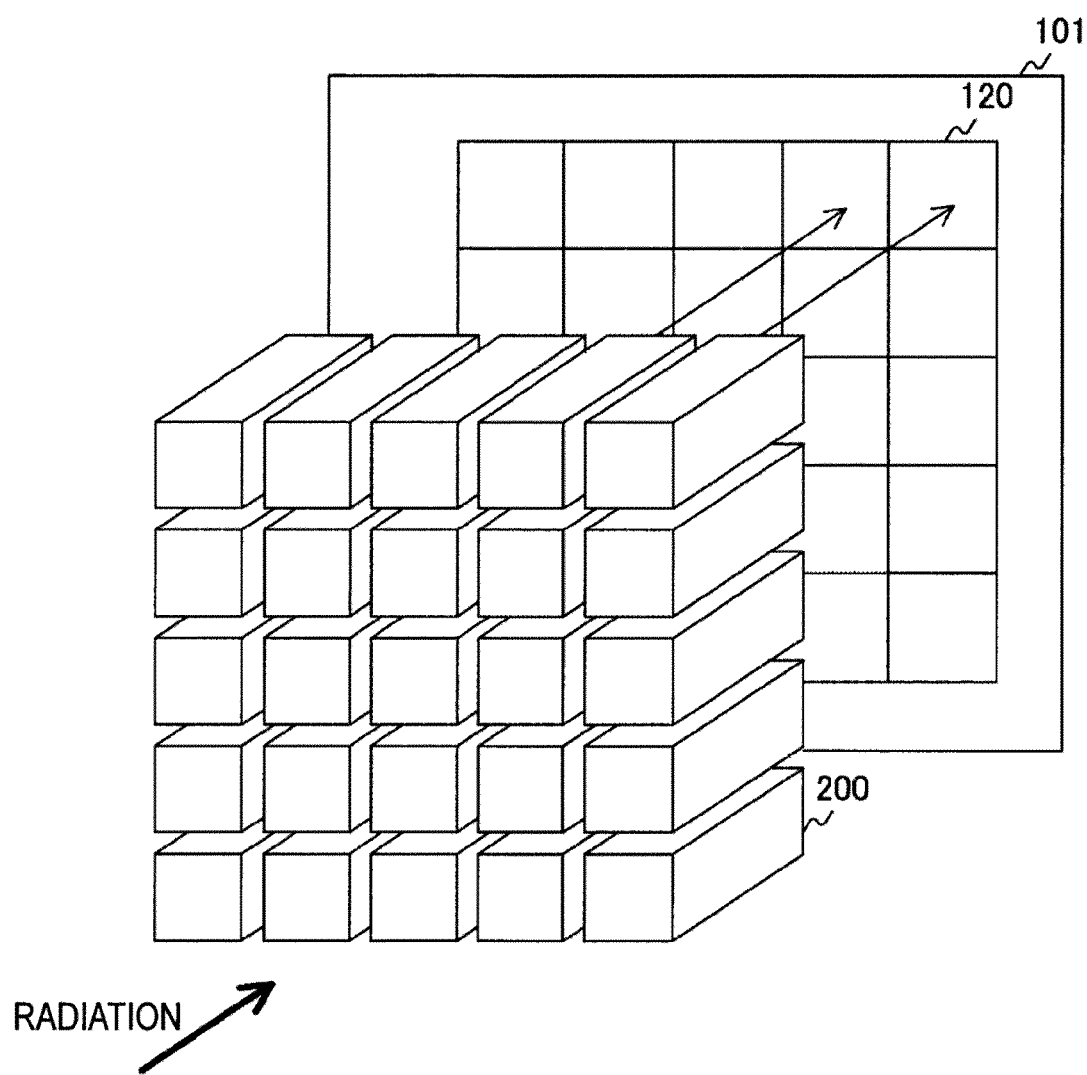
RADIATION

[Fig. 10]
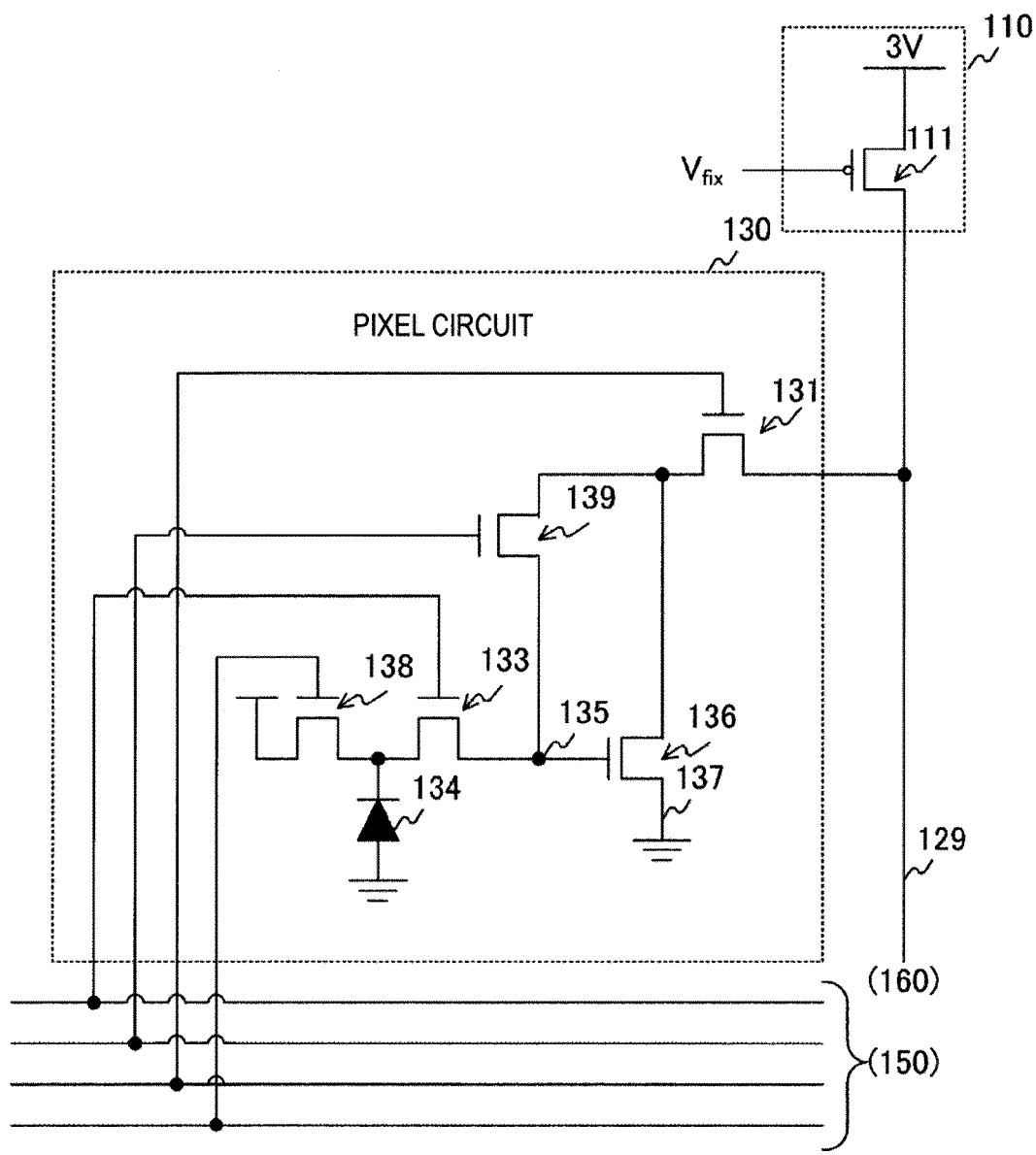

[Fig. 11]
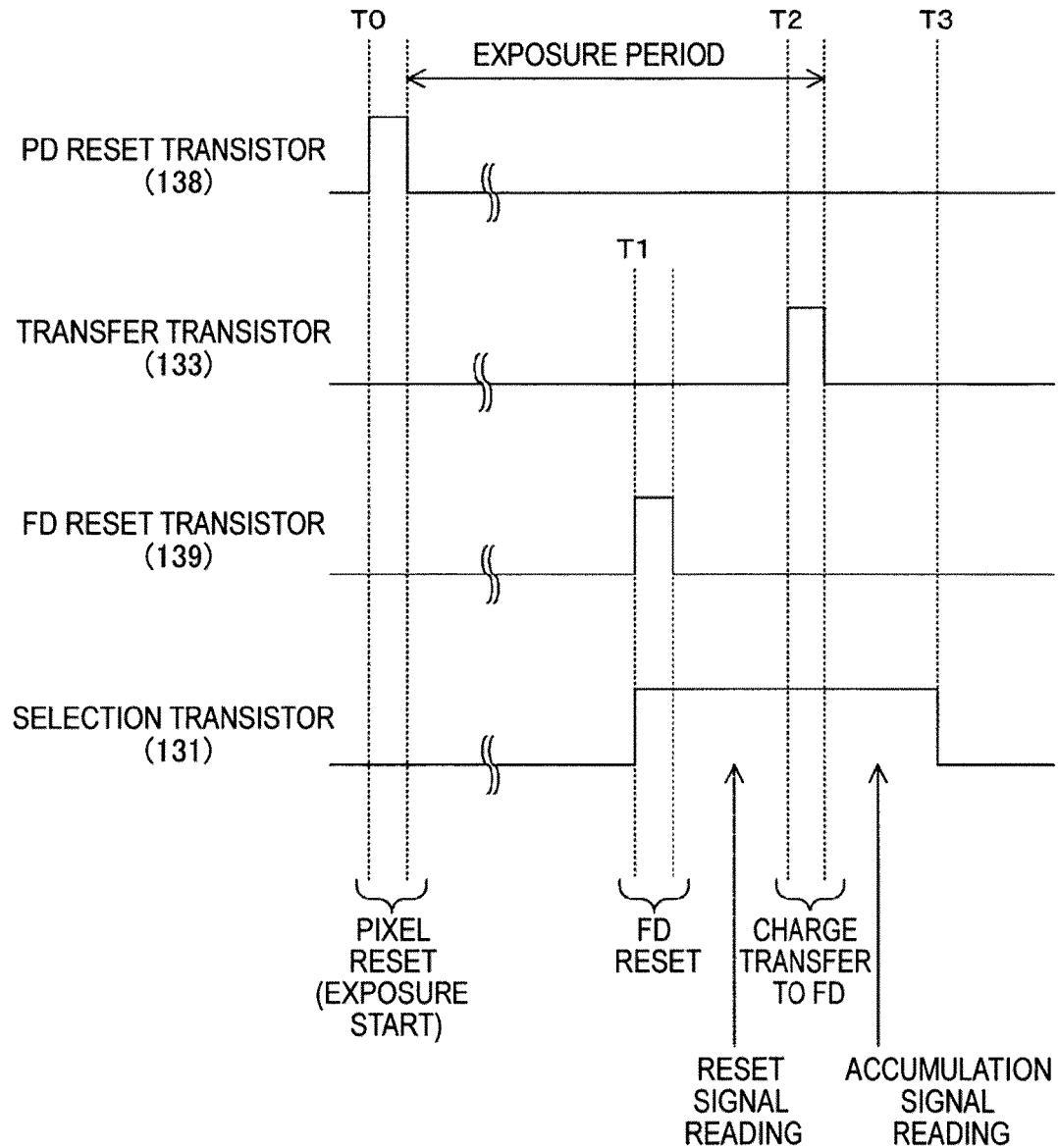

[Fig. 12]
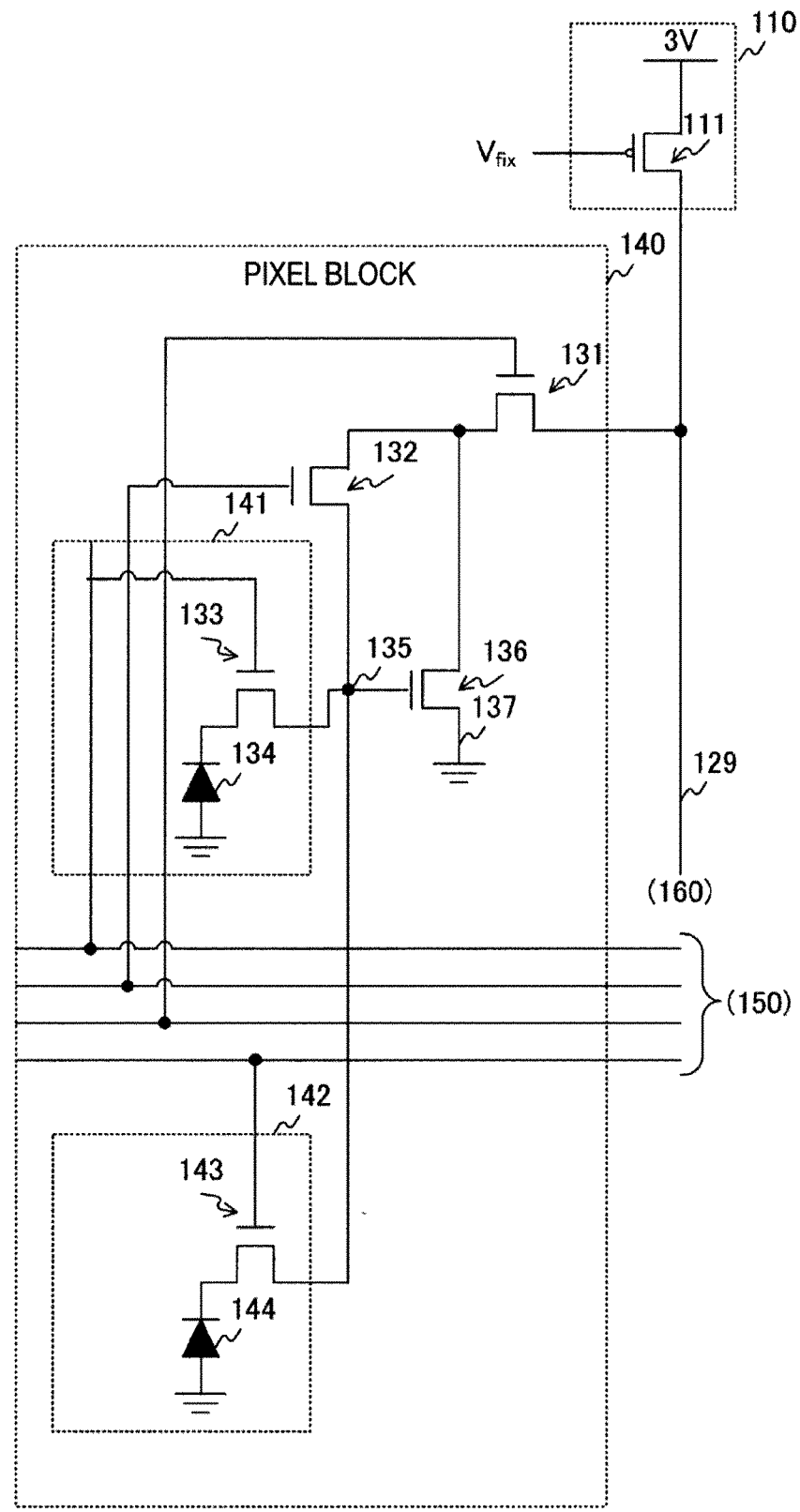

[Fig. 13]
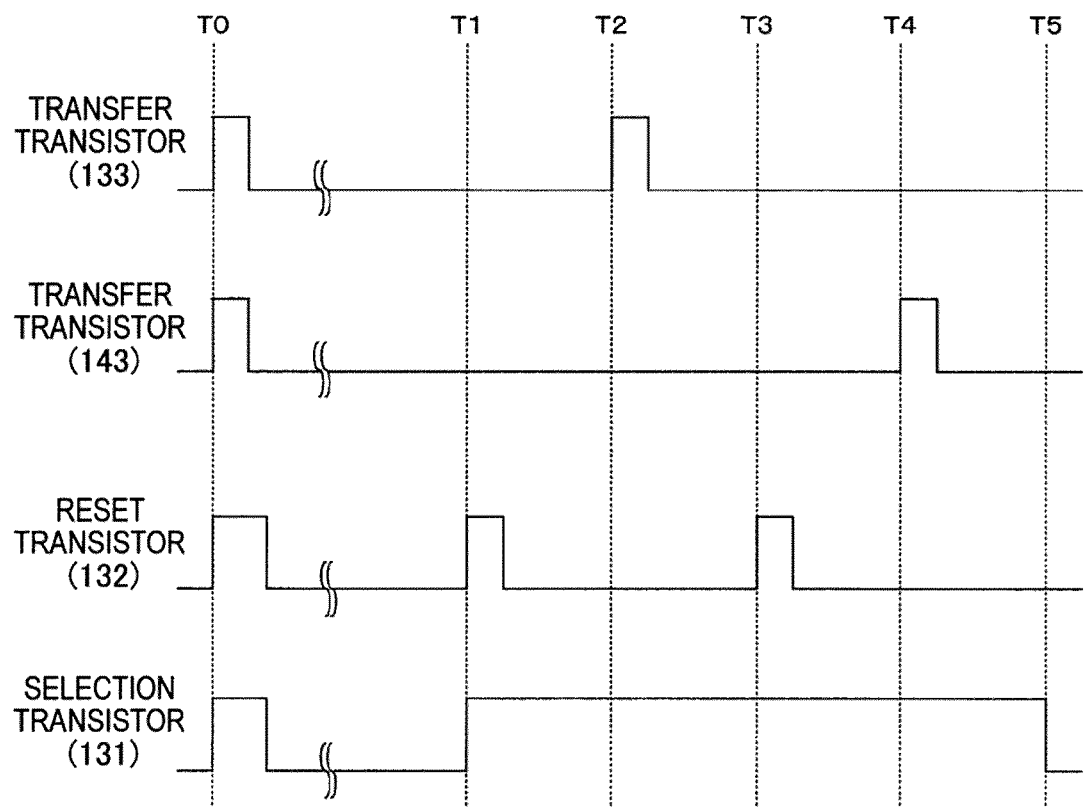

[Fig. 14]
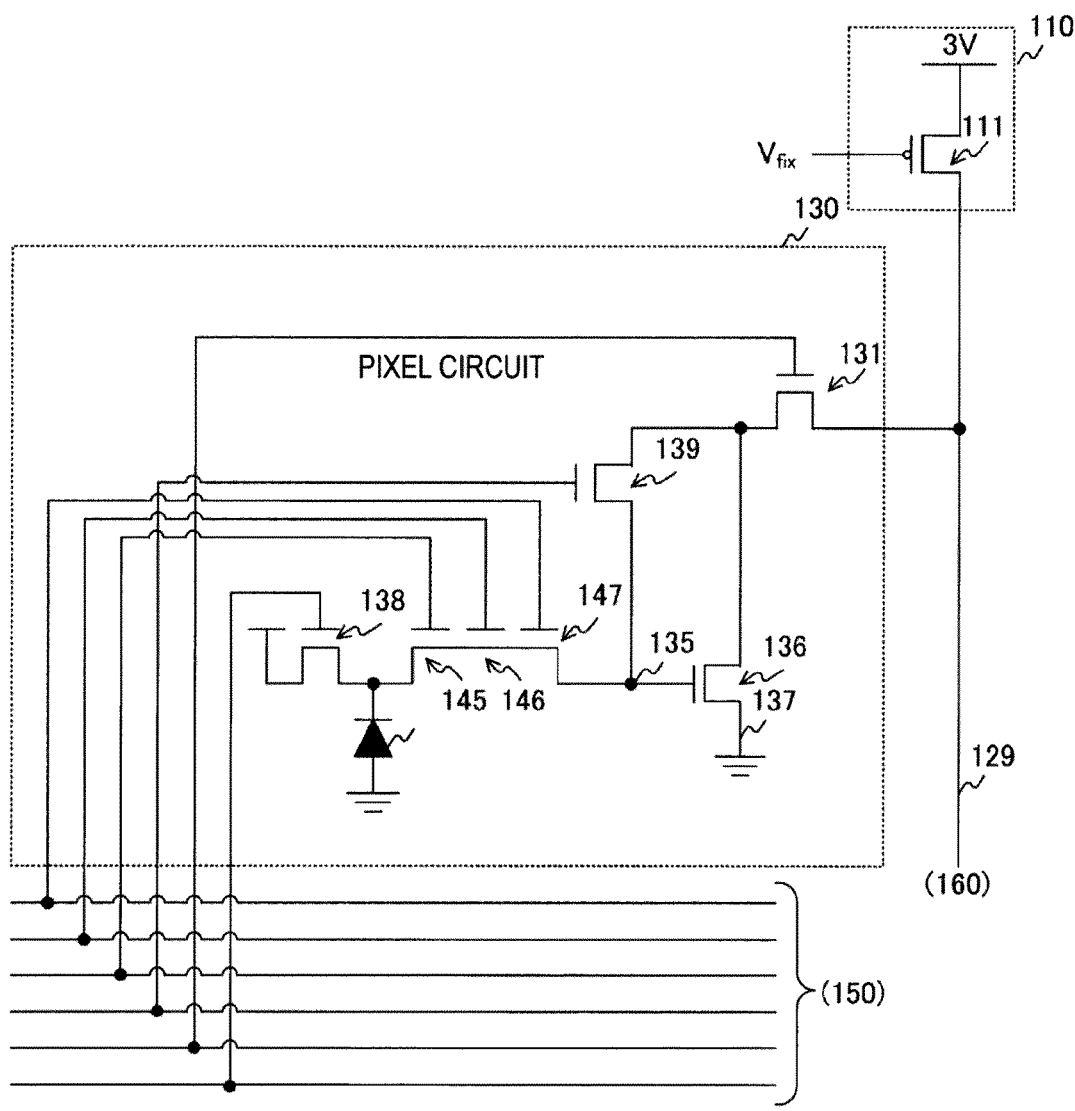

[Fig. 15]
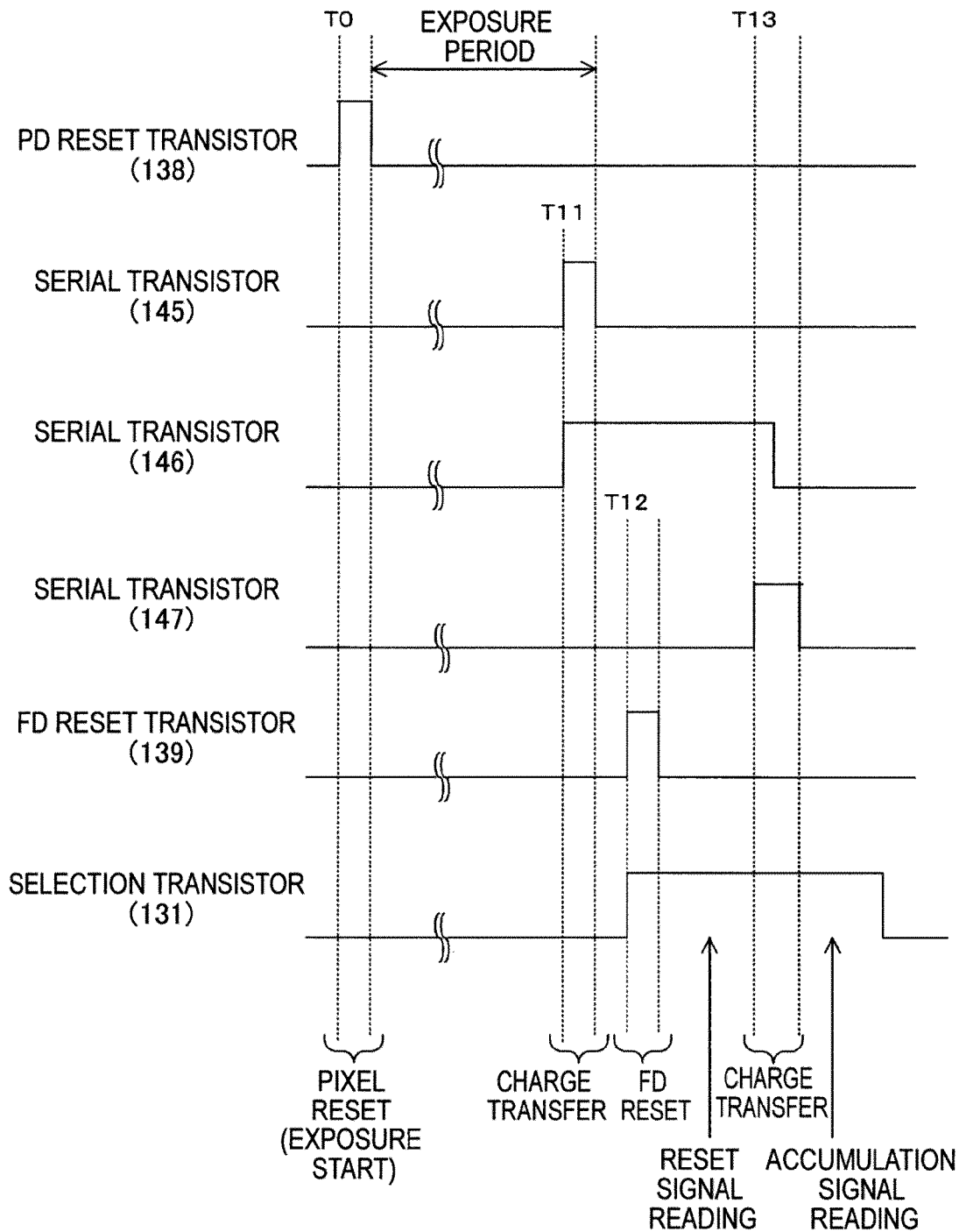

[Fig. 16]
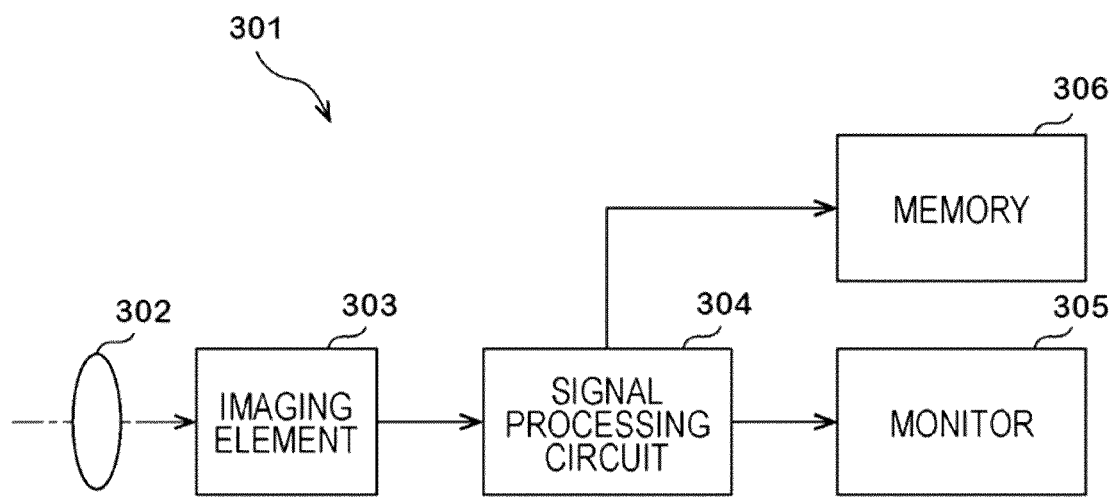

IMAGE PICKUP DEVICE, ELECTRONIC APPARATUS, RADIATION DETECTION APPARATUS AND METHOD FOR AN IMAGE PICKUP DEVICE

CROSS REFERENCE TO RELATED APPLICATIONS

This application is a national stage application under 35 U.S.C. 371 and claims the benefit of PCT Application No. PCT/JP2015/002732 having an international filing date of 29 May 2015, which designated the United States, which PCT application claimed the benefit of Japanese Patent Application No. 2014-140109 filed 08 Jul. 2014, the disclosures of which are incorporated herein by reference in their entirety.

TECHNICAL FIELD

The present technique relates to an image pickup device, an electronic apparatus, a radiation detection apparatus, and a method for an image pickup device. More specifically, the present technique relates to an image pickup device, an electronic apparatus, a radiation detection apparatus, and a method for an image pickup device.

BACKGROUND ART

In recent years, complementary metal-oxide semiconductor (CMOS) imagers have been increasingly widely used for digital still cameras, camcorders, surveillance cameras; the market thereof has also increasingly expanded. In such a CMOS imager, each pixel converts incident light to electrons by a photodiode, accumulating the electrons for a fixed period, and then outputs a signal in accordance with the accumulated charge amount to an analog to digital (AD) converter usually residing in a chip. The AD converter digitizes the signal, and then outputs the digitized signal to the following stage. In the CMOS imager, such pixels are disposed in the shape of a matrix for imaging.

A general pixel circuit includes a photodiode, a transfer transistor, a reset transistor, an amplification transistor, a floating diffusion region, a selection transistor, and the like. A photon incident into a silicon substrate of the pixel circuit generates an electron/hole pair; then the electron is accumulated in a node between the photodiode and the transfer transistor by the photodiode. The electrons are transferred to the floating diffusion region by switching ON the transfer transistor at predetermined timing to drive the gate of the amplifier transistor. Thus, signal charges become signals to vertical signal lines to be read through the selection transistor.

To the amplifier transistor and the vertical signal line, a fixed current circuit is connected. The fixed current circuit configures a source follower. A signal of a charge accumulation region is attenuated with a gain of slightly less than 1, and output to the vertical signal line.

Herein, in a general pixel circuit, one end of the reset transistor is connected to the gate of the amplification transistor through the charge accumulation region and the other end is connected to the source and the power supply of the amplification transistor. A row drive circuit draws out the electrons accumulated in the photodiode to the power supply by switching ON the reset transistor while simultaneously switching ON the transfer transistor and resets the state of the pixel circuit to a dark state before the accumulation (i.e., a state before light enters). As the voltage of the power supply, 3 V is supplied, for example.

In recent years, in such a CMOS imager, the parasitic capacitance in pixels is reduced due to miniaturization. Specifically, the parasitic capacitance of the floating diffusion region is remarkably reduced, resulting in improved conversion efficiency and improved sensitivity. In addition, the crystal quality of substrates have improved and a reduction in noise has been advanced. More specifically, the signal to noise (SN) ratio of signals has been remarkably improving. In view of such a tendency, a possibility of utilizing the CMOS imager as a photodetector for ultra low illuminance has arisen. For example, a photon counting image pickup device, in which the dynamic range has increased using time division and field division using a plurality of pixels in combination, has been proposed (for example, see Patent Literature 1.). Such a device may be used as a device for photon counting in which the entire pixel array in a chip is a single light-receiving surface; accordingly substitution for a photomultiplier and the like has been expected.

An image sensor employing such photon counting is free from a random noise and a fixed noise due to transmission and amplification of analog signals because data output from the pixels are treated as digital data from beginning to end. In this case, only a light shot noise and a dark current generated within the pixels remain. Particularly, in imaging with low illuminance, a dramatically high SN ratio can be obtained.

CITATION LIST

Patent Literature

PTL 1: JP 2011-97581A

SUMMARY

Technical Problem

In the system described above, the signal detection of the CMOS imager is carried out by AD-converting output signals from the pixels. However, for the detection of ultramicro pixel output signals, as in photon counting and the like, a technique of reducing a random noise and a fixed noise to the utmost limit while maintaining high conversion efficiency of pixels has been demanded.

As a major source of noise, particularly in the case of ultralow illuminance, a random noise generated in the amplifier transistor of a pixel, an offset of a pixel including a reset noise, an offset and a random noise generated in the ADC converter, and the like are mentioned. These offsets are to be canceled and the random noise is to be reduced to the utmost limit. However, a specific and simple technique of realizing thorough noise cancellation and noise reduction, which allows detection of one photon, has not been established under the present circumstances.

The present technique has been produced in view of such circumstances and aims at reliably detecting low intensity light.

Solution to Problem

An image pickup device according to a first embodiment of the present technology includes an amplification transistor, a photodiode configured to generate an electric charge and provide the electric charge to a first terminal of an the amplification transistor, and a selection transistor having a first terminal electrically connected to a second terminal of the amplification transistor and a second terminal of the selection transistor electrically connected to a signal line, wherein a third terminal of the amplification transistor is electrically connected to a ground potential.

An electronic apparatus according to another embodiment of the present technology includes a lens, and an image pickup device including: an amplification transistor; a photodiode configured to generate an electric charge and provide the electric charge to a first terminal of an the amplification transistor, and a selection transistor having a first terminal electrically connected to a second terminal of the amplification transistor and a second terminal of the selection transistor electrically connected to a signal line, wherein a third terminal of the amplification transistor is electrically connected to a ground potential.

A radiation detection apparatus according to another embodiment of the present technology includes an image pickup device including: an amplification transistor, a photodiode configured to generate an electric charge and provide the electric charge to a first terminal of an the amplification transistor, and a selection transistor having a first terminal electrically connected to a second terminal of the amplification transistor and a second terminal of the selection transistor electrically connected to a signal line, wherein a third terminal of the amplification transistor is electrically connected to a ground potential, and a scintillator optically coupled to the image pickup device, wherein the scintillator converts radiation into visible light and the photodiode generates the electric charge based on the visible light.

A method for driving an image pickup device according to another embodiment of the present technology includes resetting a photodiode by configuring a selection transistor to be in an ON state prior to a start of an exposure period and subsequently configuring the selection transistor to be in an OFF state after the start of the exposure period, accumulating charge at the photodiode during the exposure period; initializing a gate voltage of an amplification transistor to an initial value by configuring the selection transistor to be in an ON state prior to an end of the exposure period, reading a reset signal, the reset signal including charge output to the signal line through the selection transistor during the resetting of the photodiode; and reading an accumulation signal corresponding to the charge accumulated in the photodiode during the exposure period.

Advantageous Effects of Invention

The present technique demonstrates an outstanding effect; namely that low intensity light may be reliably detected. The effects described herein are not limited and may include any effect described in the present disclosure.

BRIEF DESCRIPTION OF DRAWINGS

FIG. 1 is a block diagram showing a configuration example of an image pickup device in a first embodiment.

FIG. 2 is an example of a circuit diagram of a pixel circuit in the first embodiment.

FIG. 3 is a timing chart showing an example of an exposure operation and a reading operation of the pixel circuit in the first embodiment.

FIG. 4 is a block diagram showing a configuration example of a plan view of the pixel circuit in the first embodiment.

FIG. 5 is an example of a circuit diagram in which a pixel circuit in the first embodiment is simplified.

FIG. 6 is an example of a graph showing characteristics of an amplifier containing an amplification transistor in the first embodiment.

FIGS. 7a and 7b are views showing a functional configuration example of a detection circuit and an operation example of the detection circuit in the first embodiment.

FIG. 8 is a timing chart showing an example of a calibration operation of the pixel circuit in the first embodiment.

FIG. 9 is the entire view showing a configuration example of a radiation counting device in a modification of the first embodiment.

FIG. 10 is an example of a circuit diagram of a pixel circuit in a second embodiment.

FIG. 11 is a timing chart showing an example of an exposure operation and a reading operation of the pixel circuit in the second embodiment.

FIG. 12 is an example of a circuit diagram of a pixel block in a third embodiment.

FIG. 13 is a timing chart showing an example of an exposure operation and a reading operation of the pixel circuit in the third embodiment.

FIG. 14 is an example of a circuit diagram of a pixel circuit in a fourth embodiment.

FIG. 15 is a timing chart showing an example of an exposure operation and a reading operation of the pixel circuit in the fourth embodiment.

FIG. 16 block diagram showing a configuration example of an imaging device in accordance with at least one embodiment.

DESCRIPTION OF EMBODIMENTS

Hereinafter, modes for carrying out the present technique (hereinafter referred to as "embodiment") are described. The description is provided in the following order.

1. First Embodiment (Example of short circuiting gate and drain of amplification transistor)
2. Second Embodiment (Example of providing PD reset transistor and short circuiting gate and drain of amplification transistor)
3. Third Embodiment (Example of short circuiting gate and drain of amplification transistor in two-pixel sharing pixel block)
4. Fourth Embodiment (Example of short circuiting gate and drain of amplification transistor in global Shutter system)

<1. First Embodiment>

"Configuration Example of Image Pickup Device"

FIG. 1 is a block diagram showing a configuration example of an image pickup device 100 of a first embodiment. The image pickup device 100 includes a plurality of fixed current circuits 110, a pixel array unit 120, a row drive circuit 150, a plurality of detection circuits 160, a plurality of switches 170, and an output circuit 180. The image pickup device 100 is an example of a semiconductor photodetection device described in the claims.

In the pixel array unit 120, a plurality of pixel circuits 130 are arranged in the shape of a two-dimensional lattice, also referred to as a matrix. Hereinafter, the plurality of pixel circuits 130 arranged in a predetermined direction are referred to as a "row" and the plurality of pixel circuits 130 arranged in a direction vertical to the row are referred to as a "column". The fixed current circuit 110, the detection circuit 160, and the switch 170 are provided in each column.

The pixel circuit 130 converts light to an analog electric signal according to the control of the row drive circuit 150. The pixel circuit 130 supplies the electric signal to the corresponding detection circuit 160 through a vertical signal line 129.

The row drive circuit 150 controls each of the pixel circuits 130 through a plurality of control lines. The row drive circuit 150 successively selects the rows, causes the selected row to perform an exposure, and then causes the pixel circuit 130, in the row in which the exposure is completed, to output an electric signal therefrom. The electric signal is read by the detection circuit 160. The control of successively causing the rows to perform exposure as described above is referred to as a rolling shutter system. The details of the control in the exposure and the reading of the electric signals are described later. The row drive circuit 150 is an example of a drive circuit described in claims.

The fixed current circuit 110 generates a fixed current and supplies the same to the corresponding vertical signal line 129.

The detection circuit 160 performs photon detection based on an electric signal. The detection circuit 160 performs AD conversion and CDS (Correlated Double Sampling) processing on an electric signal in order to detect light. The detection circuit 160 supplies a digital signal indicating the detection result to the switch 170.

The switch 170 opens and closes a path between the corresponding detection circuit 160 and the output circuit 180. The switch 170 of each column successively supplies a digital signal to the output circuit 180 according to the control of a column drive circuit (not illustrated), which successively selects the columns.

The output circuit 180 outputs a digital signal to an image processing apparatus and the like. Completing the output of the digital signals of all the rows results in the completion of the output of image data of one frame.

"Configuration Example of Pixel Circuit"

FIG. 2 shows an example of a circuit diagram of the pixel circuit 130 in the first embodiment. The pixel circuit 130 includes a selection transistor 131, a reset transistor 132, a transfer transistor 133, a photodiode 134, a floating diffusion region 135, and an amplification transistor 136. For example, an n-type metal-oxide-semiconductor field-effect transistor (MOSFET) is used as the selection transistor 131. The n-type MOSFET and the like are similarly used for the reset transistor 132, the transfer transistor 133, and the amplification transistor 136.

The gate of the transfer transistor 133 is connected to the row drive circuit 150, the source is connected to the photodiode 134, and the drain is connected to the floating diffusion region 135. The gate of the reset transistor 132 is connected to the row drive circuit 150 and the source is connected to the gate of the amplification transistor 136 through the floating diffusion region 135. The drain of the reset transistor 132 is connected to the drain of the amplification transistor 136 and the source of the selection transistor 131.

The gate of the amplification transistor 136 is connected to the reset transistor 132 and the transfer transistor 133 through the floating diffusion region 135 and a ground potential is applied to the source. The drain of the amplification transistor 136 is connected to the selection transistor 131 and the reset transistor 132. The gate of the selection transistor 131 is connected to the row drive circuit 150, the source is connected to the reset transistor 132 and the amplification transistor 136, and the drain is connected to the vertical signal line 129.

The photodiode 134 converts light to a charge. The charge generated by the photodiode 134 is accumulated in a node (not illustrated) between the photodiode 134 and the transfer transistor 133. The photodiode 134 is an example of the photoelectric conversion element described in claims.

The transfer transistor 133 transfers the charge from the photodiode 134 to the floating diffusion region 135 according to the control of the row drive circuit 150.

The floating diffusion region 135 accumulates the charge from the photodiode 134 and reduces the gate voltage of the amplification transistor 136 according to the amount of the accumulated charges. The floating diffusion region 135 is an example of a charge accumulation unit described in claims.

When the gate voltage is higher than the threshold voltage, the amplification transistor 136 amplifies the gate voltage and then outputs the same from the drain.

Herein, the fixed current circuit 110 connected to the vertical signal line includes a P-type MOS transistor 111, for example. To the gate of this MOS transistor, a fixed voltage Vfix is applied, a power supply voltage (for example, 3 V) is applied to the drain, and the source is connected to the vertical signal line 129. Since the gate voltage is fixed, the MOS transistor 111 operates in a saturated state and supplies a fixed current.

Since the source of the amplification transistor 136 is grounded and the fixed current circuit 110 is connected to the drain through the vertical signal line as described above, the amplification transistor 136 configures an open loop type amplifier together with the fixed current circuit 110. Such an amplifier may output the input voltage of the floating diffusion region 135 at a gain of several tens to several tens of times by selecting an appropriate operation point, for example. The amplified voltage is supplied to the detection circuit 160 through the vertical signal line 129.

The reset transistor 132 initializes the pixel circuit 130 according to the control of the row drive circuit 150. When the exposure start is instructed by the row drive circuit 150, the reset transistor 132 is shifted to the ON state to short circuit the gate and the drain of the amplification transistor 136. At the exposure start, the selection transistor 131 is also simultaneously shifted to the ON state. By the control, the charges of the photodiode 134 are drawn out to the vertical signal line 129 through the floating diffusion region 135, the reset transistor 132, and the selection transistor 131. The photodiode 134 is, for example, an embedded type in which an N-type node diffusion layer is surrounded by a P-type well diffusion layer and is completely depleted by biasing the floating diffusion region 135 by about 1 V with respect to the well diffusion layer, so that all the accumulated charges are drawn out. The control at the exposure start is referred to as "photo diode (PD) reset" below.

The reset transistor 132 is shifted to the ON state also when the initialization of the voltage of the floating diffusion region (hereinafter referred to as FD: Floating Diffusion) 135 (hereinafter referred to as "FD reset") is instructed. By the FD reset, the voltage of the floating diffusion region 135, i.e., the gate voltage of the amplification transistor 136, is initialized to an initial value. Since the gate and the drain of the amplification transistor 136 are short circuited at the initialization as described above, the gate voltage is initialized to a balanced voltage when the voltages of the gate and the drain are balanced. The balanced voltage is a voltage in a normal operation region described later. The reset transistor 132 is an example of a voltage initialization unit described in claims.

The selection transistor 131 connects the drain of the amplification transistor 136 to the vertical signal line 129 according to the control of the row drive circuit 150. The selection transistor 131 is shifted to the ON state also at the PD reset (in other words, exposure start) in addition to the timing of reading an electric signal.

FIG. 3 is a timing chart showing an example of an exposure operation and a reading operation of the pixel circuit in the first embodiment.

At an exposure start timing T0, the row drive circuit 150 performs the PD reset. In the PD reset, the row drive circuit 150 controls the transfer transistor 133, the reset transistor 132, and the selection transistor 131 to be in the ON state, and, after the lapse of a pulse period, controls them to be in the OFF state. By the control, the floating diffusion region 135 is shifted to the floating state, and then new charge accumulation is started. During the charge accumulation (i.e., during the exposure period), the reset transistor is controlled to be in the OFF state but may be still in the ON state. On the other hand, the selection transistor 131 is controlled to be in the OFF state in order to enable the access of the other pixel circuits 130 connected to the vertical signal line 129.

Next, the reading operation of electric signals is described. At timing T1 immediately before the end of an exposure, the row drive circuit 150 controls the selection transistor 131 to be in the ON state. Moreover, the row drive circuit 150 controls the reset transistor 132 to be in the ON state at the timing T1. When the reset transistor 132 is switched ON, the floating diffusion region 135, which is the input of the amplification transistor 136, and the vertical signal line 129 are short circuited. Thus, a reference potential specific to the selected pixel circuit 130 is generated.

Then, when the pulse period has passed from the timing T1, the row drive circuit 150 controls the reset transistor 132 to be in the OFF state. At this time, the potential of the floating diffusion region 135 decreases from the reference potential to be in a floating state in response to the influence of the coupling with the gate of the amplification transistor 136. In the floating diffusion region 135, a significant kTC noise is generated. This procedure is equivalent to the FD reset described above.

Subsequently, after the reset transistor 132 is controlled to be in the OFF state, an electric signal is read as a reset signal by the detection circuit 160 during a period before timing T2.

At the timing T2, the row drive circuit 150 controls the transfer transistor 133 to be in the ON state. Thus, electrons accumulated in a node between the photodiode 134 and the transfer transistor 133 flow into the floating diffusion region 135. At this time, when the potential of the floating diffusion region 135 is sufficiently high, all the electrons accumulated in the node between the photodiode 134 and the transfer transistor 133 flow into the floating diffusion region 135, so that the node is completely depleted.

Then, when the pulse period has passed from the timing T2, the row drive circuit 150 controls the transfer transistor 133 to be in the OFF state. Thus, the potential of the floating diffusion region 135 decreases corresponding to the accumulated charges as compared with the potential before driving the transfer transistor 133. A signal is amplified corresponding to the decreased potential by the amplification transistor 136 to be output to the vertical signal line 129.

An electric signal is read as an accumulation signal by the detection circuit 160 during a period from the timing when the transfer transistor 133 is controlled to be in the OFF state before timing T3. The detection circuit 160 compares the reset signal and the accumulation signal to determine the amount of incident photons. An output noise component caused by the kTC noise and the like generated at the FD reset is offset by setting the difference between the accumulation signal and the reset signal as a net accumulation signal.

The exposure period of the pixel circuit 130 is a period from the timing when the transfer transistor 133 is switched OFF after timing T0 to the timing when the transfer transistor 133 is switched off again after the reading of the reset signal. When a photon enters the photodiode during the period, so that a charge is generated, it is derived by the detection circuit 160 as a difference between signals in a second reading of an accumulation signal.

FIG. 4 is a block diagram showing a configuration example of a plan view of the pixel circuit 130 in the first embodiment. In FIG. 4, each oblique line indicates the gate electrode of each of the transistors and the dashed lines indicate metal wiring lines. The input node of the amplifier is configured from the floating diffusion region 135 sandwiched between the transfer transistor 133 and the reset transistor 132, the gate of the amplification transistor 136, and a wiring portion therebetween and the elements are disposed in such a manner that the area is the minimum area. Thus, a minimum parasitic capacitance of the floating diffusion region 135 may be designed, and further the parasitic capacitance may decrease in accordance with improvements made to semiconductor processing techniques.

For example, the SN ratio of the pixel output of one photon signal is practically determined by the amplitude of one electron of the floating diffusion region 135 (parasitic capacitance of a charge of one electron) and a random noise in terms of the gate of the amplification transistor 136. While the latter is determined by a design specific to the amplification transistor 136, the former is determined by the parasitic capacitance of the floating diffusion region 135. Therefore, it is desirable to minimize the parasitic capacitance of the floating diffusion region 135 as much as possible. From this viewpoint, the present disclosure employs not a closed loop type in which the output of the amplifier is fed back to the input of the amplifier but an open loop type amplifier having no feedback loop. The SN ratio in terms of the input of the amplifier is determined here, and a signal and a noise are multiplied at the same gain while maintaining the same SN ratio to be output to the signal line, such as the vertical signal line.

An amplifier having high gain is utilized in the pixel circuit 130 herein for the purpose of suppressing various noises on the side of the detection circuit 160. However, on the other hand, such an amplifier is limited in the range of the input at which the amplifier operates with high sensitivity as compared with a usual source follower. Therefore, when the FD reset is carried out at a fixed potential, as in former cases, a problem of shifting from an appropriate operation point arises in response to the influence of variations of the characteristics of the transistors in each lot, each chip, or each pixel. On the other hand, in the first embodiment, since the floating diffusion region 135 and the pixel output (vertical signal line 129) are short circuited, an appropriate input level is obtained in each pixel.

FIG. 5 shows an example of a circuit diagram having a simplified pixel circuit 130. In FIG. 5, a portion in which the amplifier is configured is extracted from the pixel circuit 130. As shown in FIG. 5, the amplifier is configured from the amplification transistor 136 and the fixed current circuit 110. The input terminal (i.e., gate of the amplification transistor 136) of the amplifier is connected to the floating diffusion region 135 and the voltage is set to Vfd. The output terminal of the amplifier is a connection point between the vertical signal line 129 and the amplification transistor 136, and the voltage is set to Vout.

FIG. 6 shows an example of a graph depicting the characteristics of the amplifier including the amplification transistor 136 in the first embodiment. FIG. 6 is a view showing an example of the relationship between the input voltage Vfd and the output voltage Vout. In FIG. 6, the vertical axis represents the output voltage Vout and the horizontal axis represents the input voltage Vfd. The unit of these voltages is volt (V), for example. The thick line curve in FIG. 6 shows the characteristics of an average amplifier Am1. The dashed line curve shows the characteristics of an amplifier Am2 different in the normal operation region from the amplifier Am1.

Herein, the normal operation region of the amplifier is an input voltage region where the gain of the output voltage Vout to the input voltage Vfd is higher than a predetermined value.

When the FD reset is performed at a voltage in the normal operation region in the amplifier Am1, a linear output characteristic is obtained due to a high gain as shown in FIG. 6. However, since the threshold voltage and the like of the transistors vary in each manufacturing process, each chip, or each pixel, the input-and-output characteristics of the amplifier Am2 of a certain pixel circuit 130 are shifted to the high voltage side as indicated by the dashed line, and the normal operation region is on a high potential side relative to the normal operation region of the amplifier Am1. When it is supposed that the FD reset is performed in the amplifier Am2 at a voltage within the normal operation region of the amplifier Am1 (i.e., voltage outside the normal operation region of the amplifier Am2), a sufficient high gain is not obtained, so that a normal operation is not expected. Therefore, it becomes difficult to detect weak light with low noise.

On the other hand, when the FD reset is performed by a short circuit between the gate and the drain, the reset potential Vrst1 and Vrst2, as indicated by the intersection between a straight line when the input voltage Vfd and the input voltage Vout, are balanced and the characteristic curve of each transistor is shifted. Therefore, when the characteristic curve is shifted to the high voltage side, the reset potential is also shifted to the high voltage side so that an appropriate operation point is maintained.

In detail, the voltages Vrst1 and Vrst2 are included in the normal operation region of each of the amplifiers Am1 and Am2 when the voltages of the gate and the drain are balanced. Therefore, when initialized by the voltages Vrst1 and Vrst2 in the balanced state, a linear output characteristic is obtained having a sufficiently high gain.

Herein, in an actual pixel operation, when the reset transistor 132 is returned to the OFF state from the ON state, the Vfd in a floating state fluctuates by a fixed amount due to coupling. Or, the point where Vfd=Vout is established is shifted from the optimal operation point in terms of the design of the transistors, and therefore a further adjustment is sometimes required. These adjustment values can be predicted beforehand and tend to be fixed in any pixel circuit. Therefore, in such a case, currents of different amounts between in the FD reset and in the reading may be sent to the fixed current circuit 110 for adjustment. When a current is increased, the characteristic curve is shifted to the high voltage side and when a current is decreased, the characteristic curve is shifted to the low-voltage side. For example, when Vfd decreases due to coupling in switching OFF, the current in reading is decreased from the current in resetting to shift the characteristic curve to the low-voltage side corresponding to the decrease. By this control, a voltage, when the source and the drain are balanced, can be adjusted to a value in the normal operation region. Such current amount adjustment can be easily carried out by changing the gate potential of the MOS transistor 111 in the fixed current circuit 110.

"Configuration Example of Detection Circuit"

FIGS. 7a and 7b are views showing a functional configuration example of the detection circuit 160 and an operation example of the detection circuit 160 in the first embodiment. FIG. 7a is a circuit diagram showing a functional configuration example of the detection circuit 160 in the first embodiment. The detection circuit 160 includes a CDS circuit 161, an analog to digital converter (ADC) circuit 165, a switch 166, a register 167, and a subtractor 168.

The CDS circuit 161 removes offset components, such as a kTC noise, from an electric signal by performing correlated double sampling. The CDS circuit 161 has a switch 162, a capacitor 163, and a comparator 164.

The switch 162 is a switch for connecting the vertical signal line 129 to either the input terminal which inputs a reference voltage into the comparator 164 or the input terminal which inputs a signal to be compared into the comparator 164. This switch 162 connects the vertical signal line 129 to the input terminal (i.e., terminal on the side of the capacitor 163), which inputs a reference voltage when reset signals of the pixel circuits 130 are sampled and held. The switch 162 connects the vertical signal line 129 to the input terminal, which inputs the signal to be compared (i.e., terminal on the right side without the capacitor 163) when the comparator 164 outputs the result of the analog CDS.

The capacitor 163 is a holding capacitance for sampling and holding reset signals of the pixel circuits 130.

The comparator 164 outputs a difference between the sampled and held signal and the signal to be compared. More specifically, the comparator 164 outputs a difference between the sampled and held reset signal and the signal (i.e., the accumulation signal or the reset signal) supplied from the vertical signal line 129. In other words, the comparator 164 removes offset components and the like, such as a kTC noise, generated in the pixel circuits 130 from the accumulation signal or the reset signal.

The comparator 164 is realized by an operational amplifier with a gain of 1, for example. The comparator 164 supplies a signal corresponding to a difference to the ADC circuit 165. Herein, a signal of a difference between a reset signal, such as the sampled and held reset signal, and a reset signal is referred to as a non-signal and a signal of a difference between a reset signal and an accumulation signal is referred to as a net accumulation signal.

The ADC circuit 165 AD-converts a signal supplied from the comparator 164.

The switch 166 is a switch that switches a supply destination of the AD-converted signal generated by the ADC circuit 165. When the ADC circuit 165 outputs the result of AD-converting a non-signal (i.e., digital non-signal), the switch 166 supplies the signal to the register 167, and then causes the register 167 to latch (hold) the signal. Thus, the offset values of the comparator 164 and the ADC circuit 165 are held in the register 167. The switch 166 supplies the signal to the subtractor 168 when the ADC circuit 165 outputs the result of AD-converting the net accumulation signal (i.e., net digital accumulation signal).

The register 167 holds the result of AD-converting a non-signal. The register 167 supplies the result of AD-converting the non-signal to be held (digital non-signal) to the subtractor 168.

The subtractor 168 subtracts the value of the digital non-signal from the value of the net digital accumulation signal. The subtractor 168 outputs the subtracted result (net digital value).

FIG. 7b is a view showing an operation example of the detection circuit 160. First, a reset signal from the selected pixel circuit 130 is output to the vertical signal line 129 (Step S201).

Then, when reading the reset signal, the CDS circuit 161 holds an offset charge of the reset signal (Step S202). The output of the CDS circuit 161 reflects the difference between the input signal and the reset signal of the CDS circuit 161. When the input is the reset signal, the output is a non-signal. The CDS circuit 161 may be integrated with the comparator (not illustrated) in the ADC circuit 165 and may perform CDS by an auto zero operation thereof. The offset including a kTC noise of the selected pixel circuit 130 is canceled and eliminated by the CDS circuit 161.

Then, the input of the CDS circuit 161 is connected to the pixel output, and then the non-signal is output. The ADC circuit 165 AD-converts a first signal (i.e., non-signal) (Step S203). The signal contains offsets of the CDS circuit 161 and the ADC circuit 165 and further contains random noises of the pixels, the CDS circuit 161, and the ADC circuit 165. Values obtained by digital-converting the signals are latched in the register 167.

Next, accumulation signals are output to the vertical signal line 129 from the pixel circuits 130 (Step S204). A difference between the accumulation signal and the reset signal is output to the ADC circuit 165 of the following stage through the CDS circuit 161.

The ADC circuit 165 AD-converts a second signal (i.e., difference signal) (Step S205). The signal contains the net accumulation signal, the offsets of the CDS circuit 161 and the ADC circuit 165, and random noises of the pixel circuits 130, the CDS circuit 161, and the ADC circuit 165. The value of the register 167 is subtracted from the output by the subtractor 168, and then a difference value is output (Step S206). When the two AD conversions are performed with a sufficient resolution necessary for accuracy of the pixel signal detection, the offsets of the CDS circuit 161 and the ADC circuit 165 are canceled, so that a net accumulation signal can be obtained; such as signal contains random noises of the pixel circuits 130, the CDS circuit 161, and the ADC circuit 165.

In the present disclosure, a pixel signal is multiplied at a gain G far greater than 1 by an open loop type amplifier. Therefore, the noise associated with the CDS circuit 161 and the ADC circuit 165 remaining in Step S206 is practically 1/G. Since the other various kinds of offsets are all cancelled, the remaining noise is mostly a random noise due to the amplifier.

The sampling in S203 and S205 may be performed a plurality of times for equalization and/or may be bandwidth limited. Thus, the random noise is reduced and the pixel noise is reduced. As a result, photon detection with high sensitivity and low noise comparable to one photon detection can be performed.

When the SN ratio of the detection of one photon becomes sufficiently high, a binary determination unit, which further performs binary determination based on a threshold value from the output of Step S206, may be provided and the presence or absence of the incidence of one photon may be determined for each pixel. When such determination is carried out, the image pickup device 100 operates in a photon counting mode and the remaining noises are all filtered.

For example, a detection unit is configured from the pixel array unit 120 of 20 pixels by 20 pixels, and the amount of incidence light is determined. In this case, in the photon counting mode, the image pickup device 100 may simultaneously detect up to 400 photons. For example, the threshold value of the output result of Step S206 is determined. When it is determined that one or more photons have entered 40% or less than the entire number of pixels, the amount of incident light is derived in the photon counting mode; when it is determined that one or more photons have entered more than 40% of the entire number of pixels, the amount of incident light is derived in a usual gradation mode. Such a photodetector may determine the amount of light from a small amount of light to a large amount of light, for example, several photons to incident light of tens of thousands of photons.

FIG. 8 is a timing chart showing an example of a calibration operation of the pixel circuit 130 in the first embodiment.

In a photodetector employing the image pickup device 100, an accumulation signal is multiplied with an open loop type amplifier as described above, and therefore a gain variation in each pixel becomes relatively large. Therefore, it is desirable to perform a calibration to derive a gain in each pixel. In this case, for example, fixed and uniform low intensity light is applied, and then a gain is derived from the output. Since the gain of each pixel is generally temporally fixed, such calibration may be performed prior to product shipment and/or during periodical equipment inspection.

However, such a calibration may be complicated. For example, when an execution frequency is low, the detection accuracy may be degraded. Therefore, in order to more easily perform a calibration, it is desirable to provide a calibration function as shown in FIG. 8 in the row drive circuit 150. In FIG. 8, a dummy signal is generated by driving of the gate of the reset transistor 132 in the pixel circuit 130, and then the gain of the pixel amplifier may be derived.

Herein, since the accumulation signal of the photodiode is not used, the transfer transistor 133 is controlled to be in the OFF state during the calibration. First, the selection transistor 131 is controlled to be in the ON state at timing T5, and then a selected pixel is connected to the vertical signal line 129. Furthermore, the reset transistor 132 is switched ON, so that the floating diffusion region 135, which is the input of the amplification transistor 136, and the vertical signal line 129 connected to the output are short circuited. Thus, a reference potential specific to the selected pixel is generated.

The reset transistor 132 is controlled to be in the OFF state when a pulse period has passed from the timing T5. At this time, the potential of the floating diffusion region 135 slightly decreases from the reference potential to be in a floating state in response to coupling with the gate of the reset transistor 132. Furthermore, in the floating diffusion region 135, a significant kTC noise is generated in this case.

After the reset transistor 132 is controlled to be in the OFF state, a first reading is carried out before timing T6, and the potential appearing in the vertical signal line 129 is acquired as a reset signal of the floating diffusion region 135 by the detection circuit 160.

Then, at the timing T6, the row drive circuit 150 drives the gate of the reset transistor 132 by a fixed amount without switching ON the transfer transistor 133. This drive is carried out while maintaining the OFF state of the reset transistor 132, and the gate is driven from 0 V to −1 V, for example. At this time, the potential of the floating diffusion region 135 fluctuates by a fixed amount through the parasitic capacitance between the gate of the reset transistor 132 and the floating diffusion region 135. The potential is multiplied by the amplifier to be output to the vertical signal line 129 as a dummy signal for calibration.

A second reading (i.e., reading of a dummy signal) is carried out during a period from the timing T6 before timing T7. The detection circuit 160, which has acquired the dummy signal, compares the previously acquired reset signal with the dummy signal to determine the net dummy signal amount. The noise component of the output generated by a kTC noise and the like generated in the FD reset is cancelled by setting the difference between the accumulation signal and the dummy signal as a net dummy signal.

The dummy signal appearing in the floating diffusion region 135 is mostly fixed between pixels by driving the gate of the reset transistor 132 by a fixed amount at the timing T6. Therefore, the finally acquired net dummy signal is mostly proportional to the amount of the gain of the amplifier in each pixel circuit 130 and reflects a variation thereof.

Therefore, the image pickup device 100 may correct the gain variation of the pixel amplifier generated in each lot, each chip, or each pixel by utilizing the dummy signal as a calibration signal. Such calibration can be easily performed without the necessity of uniform light for a test, and therefore can be incorporated into a photodetection system in such a manner as to be automatically performed when switching ON the power source of the system, before measurement, and the like.

For example, a correction coefficient of each pixel proportional to the net dummy signal is derived from the net dummy signal, and stored in a memory (not illustrated) of the detection circuit 160. When the detection circuit 160 divides the accumulation signal amount of each pixel with the corresponding correction coefficient in the light amount measurement, the gain variation is corrected.

Thus, according to the first embodiment of the present technique, since the pixel circuit 130 initializes the gate voltage to a voltage in the normal operation region by a short circuit between the gate and the drain of the amplification transistor, the initialization at a voltage outside the normal operation region can be prevented. Thus, the image pickup device 100 can reliably detect low intensity light.

(Modification)

The image pickup device 100 is utilized for photon detection in the first embodiment; however the image pickup device 100 may also be utilized for radiation calculation. A modification in the first embodiment is different from the first embodiment in that the image pickup device 100 is used for radiation calculation.

FIG. 9 is an entire view showing a configuration example of a radiation counting device in the modification of the first embodiment. The radiation counting device includes a plurality of scintillators 200 and a semiconductor device 101. The semiconductor device 101 is provided with the image pickup device 100 of the first embodiment and a digital processing unit (not illustrated).

The scintillator 200 is a scintillator processed into a pillar-shape or a fiber shape and is disposed at a pitch of 1 mm, for example. Each scintillator 200 is separated by a partition, which reflects light in such a manner that light passing through the scintillator 200 is confined thereinside.

In the semiconductor device 101, a pixel array unit 120 is logically divided into a 1-mm square region corresponding to the scintillator 200. By connecting the scintillator 200 and the image pickup device 100, the scintillation light generated in the scintillator 200 is selectively applied to the corresponding division in the pixel array unit 120, and then the amount of light is measured.

The digital processing unit in the semiconductor device 101 classifies the energy of the radiation incident on the scintillator based on the amount of light emitted from the scintillators; that is, the digital processing system may measure the frequency of incidence based on the number of times light is emitted.

For example, when the size of each pixel of the semiconductor device 101 is about 4 micrometer square, a pixel circuit 130 of 250 times 250=62,500 is included in the division of the pixel array unit 120. The amount of light is calculated by summing the pixel outputs therein for each division. Each pixel output may be a gradation determination value of 10 bits or the like or may be a binary determination value, the threshold value of which is determined based on the presence or absence of incident photons.

For the scintillator 200, a cerium doped lutetium yttrium orthosilicate (LYSO:Ce) material is used, for example. In this case, the amount of light emitted when gamma rays of 662 keV enter is about 10,000 photons, and therefore the amount of light received at each pixel is 0 photon or 1 photon in many cases. In a binary determination, the amount of light may be summed as they are; but, in gradation determination, a random noise of each pixel is added thereto.

In the gradation determination, the minimum resolution (LSB: least significant bit value) is desirably sufficiently smaller than 1 photon, and thus the total noise amount is held in a stable range. For example, when the random noise of each pixel is about one electronic signal (rms), the total of the pixel noise of each division is about 250 electronic signals (rms).

Such a radiation counting device may be used alone in the detection of radioactive contamination or cosmic rays as a dosimeter. Furthermore, when a blank portion of the semiconductor device 101 is minimized by utilizing a lamination structure and detectors are laid in an array shape, the radiation counting device may be used for two-dimensional imaging of radiation, such as in a gamma camera.

Thus, according to the modification, since the radiation counting device detects low intensity scintillation light using the image pickup device 100, an amount of radiation can be counted and derived from the detection result.

<2. Second Embodiment>

In the first embodiment, although both the PD reset and the FD reset are performed by the reset transistor 132, a transistor that performs only the PD reset may be added. By the addition of the transistor that performs only the PD reset, the pixel circuit 130 can perform the PD reset in a state where the selection transistor 131 remains in the OFF state. Thus, during a reading of a specified row, the image pickup device 100 can perform the PD reset of another row and then can start the exposure. The pixel circuit 130 of the second embodiment is different from the first embodiment in that the transistor that performs only the PD reset is added.

FIG. 10 shows an example of a circuit diagram of the pixel circuit 130 in the second embodiment. The pixel circuit 130 of the second embodiment is different from the first embodiment in that a PD reset transistor 138 and a FD reset transistor 139 are provided in place of the reset transistor 132.

The FD reset transistor 139 is the same transistor as the reset transistor 132. The FD reset transistor 139 is used only for the FD reset unlike the first embodiment, and therefore a different name from the name of the first embodiment is given.

The gate of the PD reset transistor 138 is connected to the row drive circuit 150, the source is connected to the photodiode 134, and the drain is connected to the power supply of a fixed potential. The PD reset transistor 138 performs the PD reset according to the control of the row drive circuit 150. Such a PD reset transistor 138 is desirably designed in such a manner that when the amount of accumulation charges reaches a fixed amount or larger, the accumulation charges are passed to the fixed potential even in the OFF state. In this case, the PD reset transistor 138 functions as a drain for preventing blooming. The PD reset transistor 138 is an example of a charge amount initialization unit described in the claims.

FIG. 11 is a timing chart showing an example of an exposure operation and a reading operation of the pixel circuit 130 in the second embodiment. The row drive circuit 150 controls the PD reset transistor 138 to be in the ON state over the pulse period from the timing T0 of the exposure start. The transfer transistor 133, the FD reset transistor 139, and the selection transistor 131 remain in the OFF state.

The PD reset transistor 138 is maintained in the OFF state during the exposure period and during the reading of an accumulation signal. On the other hand, after the PD reset transistor 138 is controlled to be in the OFF state, the transfer transistor 133, the FD reset transistor 139, and the selection transistor 131 are controlled by the same procedure as that of the first embodiment.

Thus, according to the second embodiment, the PD reset transistor is provided, and therefore, during reading of a certain row, exposure of another row can be started. Thus, the time required to complete the exposure and reading of all the rows may be shortened.

<3. Third Embodiment>

In the first embodiment, one selection transistor 131, one reset transistor 132, one floating diffusion region 135, and one amplification transistor 136 are provided in each photodiode 134. However, a circuit having one selection transistor 131, one reset transistor 132, one floating diffusion region 135, and one amplification transistor 136 may be shared by a plurality of photodiodes 134. Thus, the number of the transistors of the pixel array unit 120 can be reduced. An image pickup device 100 of the third embodiment is different from that of the first embodiment in that a plurality of photodiodes 134 shares the floating diffusion region 135 and the like.

FIG. 12 shows an example of a circuit diagram of a pixel block 140 in the third embodiment. A plurality of the pixel blocks 140 is provided in the pixel array unit 120 of the image pickup device 100. The pixel block 140 has the selection transistor 131, the reset transistor 132, the floating diffusion region 135 and the amplification transistor 136, and pixel circuits 141 and 142.

The pixel circuit 141 has the photodiode 134 and the transfer transistor 133.

A circuit containing the selection transistor 131, the reset transistor 132, the floating diffusion region 135, the amplification transistor 136, and the pixel circuit 141 is the same configuration as that of the pixel circuit 130 of the first embodiment. However, the floating diffusion region 135 is also connected to the pixel circuit 142.

The pixel circuit 142 has a transfer transistor 143 and a photodiode 144. The gate of the transfer transistor 143 is connected to the row drive circuit 150, the source is connected to the photodiode 144, and the drain is connected to the floating diffusion region 135. As the transfer transistor 143, an n-type MOSFET is used, for example.

The photodiodes 134 and 144 are examples of a photoelectric conversion element described in the claims. The circuit containing the transfer transistors 133 and 143 is an example of a transfer unit described in the claims.

The two pixel circuits 141 and 142 share one floating diffusion region 135 and the like, but a configuration may be acceptable in which three or more pixel circuits share one floating diffusion region 135 and the like.

FIG. 13 is a timing chart showing an example of an exposure operation and a reading operation of the pixel block 140 in the third embodiment.

A method for controlling the transfer transistor 133, the reset transistor 132, and the selection transistor 131 from the timing T0 to the timing T3 is the same as that of the first embodiment.

The transfer transistor 143 is controlled to be in the ON state over the pulse period from the timing T0. Then, the reset transistor 132 is controlled to be in the ON state again over the pulse period from the timing T3 after the timing T2. On the other hand, the selection transistor 131 is held in the ON state between the timings T1 and T5.

A reset signal of the pixel circuit 142 is read during a period from the time when the transfer transistor 143 is controlled to be in the OFF state to timing T4.

Then, the transfer transistor 143 is controlled to be in the ON state over the pulse period from the timing T4. An accumulation signal of the pixel circuit 142 is read during a period from the time when the transfer transistor 143 is controlled to be in the OFF state to the timing T5. Then, the selection transistor 131 is controlled to be in the OFF state at the timing T5.

Thus, according to the third embodiment, since a plurality of pixel circuits shares one reset transistor and the like, the number of the transistors can be reduced.

<4. Fourth Embodiment>

The image pickup device 100 performs exposure by a rolling shutter system in the first embodiment; but, the exposure may be performed by a global shutter system. An image pickup device 100 of the fourth embodiment is different from that of the first embodiment in that exposure is performed by a global shutter system.

FIG. 14 shows an example of a circuit diagram of the pixel circuit 130 in the fourth embodiment. The pixel circuit 130 of the fourth embodiment is different from the first embodiment in having serial transistors 145, 146, and 147 in place of the transfer transistor 133, the PD reset transistor 138, and the FD reset transistor 139.

The configurations of the PD reset transistor 138 and the FD reset transistor 139 are the same as those of the second embodiment.

The serial transistors 145, 146, and 147 are integrated three-stage transistors.

The serial transistor 145 transfers a charge to the serial transistor 146 from the photodiode 134 according to the control of the row drive circuit 150. The serial transistor 145 is an example of a first transfer transistor described in claims.

The serial transistor 146 holds the charge in a channel and is used as an analog memory.

The serial transistor 147 transfers the charge to the floating diffusion region 135 from the serial transistor 146 according to the control of the row drive circuit 150. The serial transistor 147 is an example of a second transfer transistor described in claims.

FIG. 15 is a timing chart showing an example of an exposure operation and a reading operation of the pixel circuit 130 in the fourth embodiment.

First, only the PD reset transistor 138 is controlled to be in the ON state over the pulse period from the timing T0.

Next, the serial transistors 145 and 146 are controlled to be in the ON state at timing T11 immediately before the end of exposure. Then, when the pulse period has passed from the timing T11, the serial transistor 145 is controlled to be in the OFF state. By the control, the charges accumulated in the photodiode 134 are transferred to and held at the channel of the analog memory (i.e., serial transistor 146).

The PD reset and the charge transfer to the analog memory are simultaneously performed in all the pixels, for example. Thus, the exposure of a global shutter system is realized.

On the other hand, reading of an electric signal by the detection circuit 160 is successively performed in each row. At timing T12 after the timing T11, the FD reset transistor 139 and the selection transistor 131 are controlled to be in the ON state, and then the FD reset is performed. Then, the serial transistor 147 is controlled to be in the ON state over the pulse period from timing T13 after the reading of a reset signal, Then, charges are transferred from the analog memory to the floating diffusion region 135.

Calibration in the fourth embodiment is performed by the same procedure as that of the first embodiment.

Thus, according to the fourth embodiment, since the analog memory, the transistor that transfers charges to the analog memory, and the transistor that transfers charges from the analog memory are provided in each pixel circuit, all the pixel circuits 130 can be simultaneously exposed.

<Imaging Device>

FIG. 16 is a block diagram illustrating a configuration example of an imaging device, which is mounted in an electronic apparatus.

As illustrated in FIG. 16, an imaging device 301 is configured to include an optical system 302, an imaging element 303, a signal processing circuit 304, a monitor 305, and a memory 306. Although an optical system 302, an imaging element 303, a signal processing circuit 304, a monitor 305, and a memory 306 are illustrated, the imaging device 301 may have additional components; alternatively, the imaging device 301 may have less components.

The optical system 302 is configured to include one or a plurality of lenses. The optical system 302 gathers and/or focuses image light (i.e., incident light) from a subject to the imaging element 303, and an image formation is made at a light-receiving surface (i.e., sensor portion) of the imaging element 303.

The image pickup device 100 according to each embodiment described above may be the imaging element 303. Electrons are stored in the imaging element 303 for a predetermined period, according to an image that is formed at the light-receiving surface through the optical system 302. Then, a signal, such as a digital signal, according to the electrons that are stored in the imaging element 303 is supplied to the signal processing circuit 304.

The signal processing circuit 304 performs various signal processing with respect to the pixel signal that is output from the imaging element 303. An image (i.e., image data) that is obtained by performing the signal processing by the signal processing circuit 304 is supplied to the monitor 305 to be displayed, and is supplied to the memory 306 and stored (recorded) there.

The imaging device 301 configured in this way can apply the image pickup device 100 according to each embodiment described above, thereby reliably detecting low intensity light.

The above-described embodiments are examples for embodying the present technology and matters in the embodiments each have a corresponding relationship with disclosure-specific matters in the claims. Likewise, the matters in the embodiments and the disclosure-specific matters in the claims denoted by the same names have a corresponding relationship with each other. However, the present technology is not limited to the embodiments and various modifications of the embodiments may be embodied in the scope of the present technology without departing from the spirit of the present technology.

The processing sequences that are described in the embodiments described above may be handled as a method having a series of sequences or may be handled as a program for causing a computer to execute the series of sequences and as a recording medium for storing the program. As the recording medium, a CD (Compact Disc), an MD (Mini-Disc), and a DVD (Digital Versatile Disk), a memory card, and a Blu-ray disc (registered trademark) can be used.

In addition, the effects described in the present specification are not limiting but are merely examples, and there may be additional effects.

Further, for example, the present technology may have the following configurations.

(1) An image pickup device including: an amplification transistor; a photodiode configured to generate an electric charge and provide the electric charge to a first terminal of the amplification transistor; and a selection transistor having a first terminal electrically connected to a second terminal of the amplification transistor and a second terminal of the selection transistor electrically connected to a signal line, wherein a third terminal of the amplification transistor is electrically connected to a ground potential.

(2) The image pickup device according to (1), further including a fixed current circuit configured to provide a fixed current to the signal line.

(3) The image pickup device according to (1) or (2), further including: a floating diffusion region; and a reset transistor, wherein the first terminal of the amplification transistor and a first terminal of the reset transistor are electrically connected to the floating diffusion region, and a second terminal of the reset transistor is electrically connected to the first terminal of the selection transistor and the second terminal of the amplification transistor.

(4) The image pickup device according to (3), further including: a transfer transistor, wherein a first terminal of the transfer transistor is electrically connected to the floating diffusion region and a second terminal of the transfer transistor is electrically connected to the photodiode.

(5) The image pickup device according to (4), further including: a charge amount initialization unit configured to initialize a charge of the photodiode.

(6) The image pickup device according to (5), wherein the charge amount initialization unit includes a photodiode reset transistor, wherein a first terminal of the photodiode reset transistor is electrically connected to the photodiode and second terminal of the photodiode reset transistor is electrically connected to a supply of a fixed potential.

(7) The image pickup device according to any one of (4) to (6), further including: a second pixel circuit, the second pixel circuit including a second transfer transistor and a second photodiode, wherein a first terminal of the second transfer transistor is electrically connected to the floating diffusion region.

(8) The image pickup device according to any one of (3) to (7), wherein the reset transistor, the floating diffusion region, the selection transistor, and the amplification transistor are shared by at least two pixel circuits.

(9) The image pickup device according to any one of (2) to (8), further including a storage element arranged between the photodiode and a floating diffusion region.

(10) The image pickup device according to (9), further comprising: a first transfer transistor electrically connected to the photodiode and the storage element; and a second transfer transistor electrically connected to the storage element and the floating diffusion region, wherein the storage element is a transistor.

(11) The image pickup device according to any one of (1) to (10), wherein the first terminal of the amplification transistor is a gate, the second terminal of the amplification transistor is a drain, and the third terminal of the amplification transistor is a source.

(12) An electronic apparatus comprising: a lens; and an image pickup device including: an amplification transistor; a photodiode configured to generate an electric charge and provide the electric charge to a first terminal of the amplification transistor; and a selection transistor having a first terminal electrically connected to a second terminal of the amplification transistor and a second terminal of the selection transistor electrically connected to a signal line, wherein a third terminal of the amplification transistor is electrically connected to a ground potential.

(13) A radiation detection apparatus including: an image pickup device including: an amplification transistor; a photodiode configured to generate an electric charge and provide the electric charge to a first terminal of the amplification transistor; and a selection transistor having a first terminal electrically connected to a second terminal of the amplification transistor and a second terminal of the selection transistor electrically connected to a signal line, wherein a third terminal of the amplification transistor is electrically connected to a ground potential; and a scintillator optically coupled to the image pickup device, wherein the scintillator converts radiation into visible light and the photodiode generates the electric charge based on the visible light.

(14) The apparatus according to any one of (12) to (13), further including a fixed current circuit configured to provide a fixed current to the signal line.

(15) The apparatus according to any one of (12) to (14), further including: a floating diffusion region; and a reset transistor, wherein the first terminal of the amplification transistor and a first terminal of the reset transistor are electrically connected to the floating diffusion region, and a second terminal of the reset transistor is electrically connected to the first terminal of the selection transistor and the second terminal of the amplification transistor.

(16) The apparatus according to (15), further including: a transfer transistor, wherein a first terminal of the transfer transistor is electrically connected to the floating diffusion region and a second terminal of the transfer transistor is electrically connected to the photodiode.

(17) The apparatus according to (16), further including: a charge amount initialization unit configured to initialize a charge of the photodiode.

(18) The apparatus according to (17), wherein the charge amount initialization unit includes a photodiode reset transistor, wherein a first terminal of the photodiode reset transistor is electrically connected to the photodiode and second terminal of the photodiode reset transistor is electrically connected to a supply of a fixed potential.

(19) The apparatus according to any one of (16) to (18), further including: a second pixel circuit, the second pixel circuit including a second transfer transistor and a second photodiode, wherein a first terminal of the second transfer transistor is electrically connected to the floating diffusion region.

(20) The apparatus according to any one of (15) to (19), wherein the reset transistor, the floating diffusion region, the selection transistor, and the amplification transistor are shared by at least two pixel circuits.

(21) The apparauts according to any one of (15) to (20), further including a storage element arranged between the photodiode and the floating diffusion region.

(22) The apparatus according to (21), further comprising: a first transfer transistor electrically connected to the photodiode and the storage element; and a second transfer transistor electrically connected to the storage element and the floating diffusion region, wherein the storage element is a transistor.

(23) The apparatus according to any one of (12) to (22), wherein the first terminal of the amplification transistor is a gate, the second terminal of the amplification transistor is a drain, and the third terminal of the amplification transistor is a source.

(24) A method for driving an image pickup device including: accumulating charge at a photodiode during an exposure period; initializing a gate voltage of an amplification transistor to an initial value by configuring a selection transistor to be in an ON state prior to an end of the exposure period; reading a reset signal, the reset signal including charge output to a signal line through the selection transistor during a resetting of the photodiode; and reading an accumulation signal corresponding to the charge accumulated in the photodiode during the exposure period, wherein the charge is provided to the gate of the amplification transistor.

(25) The method according to (24), further including resetting the photodiode by configuring the selection transistor to be in an ON state prior to a start of the exposure period and subsequently configuring the selection transistor to be in an OFF state after the start of the exposure period.

(26) The method according to (25), further comprising providing a fixed current to at least one of the drain and source of the amplification transistor.

(27) The method according to (26), further comprising resetting a floating diffusion region during the exposure period.

(28) The method according to (27), further comprising transferring charge accumulated at the photodiode to the floating diffusion region prior to the end of the exposure period.

(29) The method according to (27), wherein the floating diffusion region, the selection transistor, and the amplification transistor are shared by at least two pixel circuits.

(30) The method according to (24), further comprising controlling a photodiode reset transistor to an OFF state prior to a start of the exposure period.

(31) The according to (24), further comprising:
transferring the charge accumulated at the photodiode during the exposure period to a storage node through a first transistor; and transferring the charge from the storage node to a floating diffusion region.

Additionally, for example, the present technology may have the following configurations.

(1) A pixel circuit including:
an amplification unit which amplifies, in a predetermined region containing a balanced voltage at which an input voltage of an input terminal and an output voltage of an output terminal are balanced, the input voltage at a gain higher than a predetermined value;

a photoelectric conversion unit which converts light to a charge;

a charge accumulation unit which accumulates the charge and supplies a voltage according to an amount of the accumulated charges to the input terminal; and a voltage initialization unit which initializes the input voltage to the balanced voltage by a short circuit between the input terminal and the output terminal when initialization of the input voltage is instructed.

(2) The pixel circuit according to (1), further including:

a charge amount initialization unit which initializes the amount of the charges in the photoelectric conversion unit when initialization of the photoelectric conversion unit is instructed.

(3) The pixel circuit according to (1) or (2), wherein the photoelectric conversion unit includes a plurality of photoelectric conversion elements which convert the light to the charge, and a transfer unit which successively selects the plurality of photoelectric conversion elements, and then transfers the charge converted by the selected photoelectric conversion element to the charge accumulation unit, and wherein the voltage initialization unit initializes the input voltage in synchronization with timing at which each of the plurality of photoelectric conversion elements is selected.

(4) The pixel circuit according to any one of (1) to (3), wherein the amplification unit includes a field effect transistor in which a fixed potential is applied to a source, a gate serves as the input terminal, and a drain is connected to the output terminal.

(5) The pixel circuit according to (4), wherein the amplification unit further includes a selection transistor which connects the drain to the output terminal when the pixel circuit is selected and the initialization of the input voltage is instructed.

(6) A semiconductor photodetection device including:

a plurality of pixel circuits each including an amplification unit which amplifies, in a predetermined region containing a balanced voltage at which an input voltage of an input terminal and an output voltage of an output terminal are balanced, the input voltage at a gain higher than a predetermined value, a photoelectric conversion unit which converts light to a charge, a charge accumulation unit which accumulates the charge and supplies a voltage according to an amount of the accumulated charges to the input terminal, and a voltage initialization unit which initializes the input voltage to the balanced voltage by a short circuit between the input terminal and the output terminal when initialization of the input voltage is instructed; and a detection circuit which detects a light amount of the light from the output voltage amplified in each of the plurality of pixel circuits.

(7) The semiconductor photodetection device according to claim 6, further including: a drive circuit which instructs start and end of exposure of all of the plurality of pixel circuits, wherein the photoelectric conversion unit includes a photoelectric conversion element which converts the light to the charge, an analog memory holding the charge, a first transfer transistor which transfers the charge to the analog memory from the photoelectric conversion element when the end of the exposure is instructed, and a second transfer transistor which transfers the charge to the charge accumulation unit from the analog memory after the initialization of the input voltage is instructed.

(8) The semiconductor photodetection device according to (6) or (7), wherein, when acquisition of a correction coefficient for correcting the output voltage is instructed, the initialization unit initializes the input voltage to the balanced voltage, and then controls the input voltage to be a predetermined dummy voltage different from the balanced voltage, and, when the acquisition of the correction coefficient is not instructed, the initialization unit initializes the input voltage to the balanced voltage, and when acquisition of the correction coefficient is instructed, the detection circuit reads an electric signal of the dummy voltage as a dummy signal, and then acquires a correction coefficient according to the dummy signal, and, when the acquisition of the correction coefficient is not instructed, the detection circuit reads an electric signal of the input voltage as an accumulation signal and corrects the accumulation signal by the correction coefficient.

(9) The semiconductor photodetection device according to any one of (6) to (8), wherein the photoelectric conversion unit includes a photoelectric conversion element which converts the light to the charge, and a transfer transistor which transfers the charge to the charge accumulation unit from the photoelectric conversion element after the gate voltage is initialized, and wherein the detection circuit reads an electric signal of the output voltage as a reset signal in synchronization with timing at which the input voltage is initialized, reads an electric signal of the output voltage as an accumulation signal in synchronization with timing at which the charge is transferred, and detects a difference between the reset signal and the accumulation signal as the light amount.

(10) The semiconductor photodetection device according to (9), further including:

a fixed current circuit which supplies a fixed current which is different between when the reset signal is read and when the accumulation signal is read to a signal line to adjust the balanced voltage to a value in the region, wherein the output terminal is connected to the signal line.

(11) A radiation counting device including:

a scintillator which emits scintillation light when a radiation enters;

an amplification unit which amplifies, in a predetermined region containing a balanced voltage at which an input voltage of an input terminal and an output voltage of an output terminal are balanced, the input voltage at a gain higher than a predetermined value;

a photoelectric conversion unit which converts the scintillation light to a charge;

a charge accumulation unit which accumulates the charge and supplies a voltage according to an amount of the accumulated charges to the input terminal; and a voltage initialization unit which initializes the input voltage to the balanced voltage by a short circuit between the input terminal and the output terminal when initialization of the input voltage is instructed.

REFERENCE SIGNS LIST 100 image pickup device
101 semiconductor device
110 fixed current circuit
111 MOS transistor
120 pixel array unit
130, 141, 142 pixel circuit
131 selection transistor 132 reset transistor
133, 143 transfer transistor
134, 144 photodiode
135 floating diffusion region
136 amplification transistor
138 PD reset transistor
139 FD reset transistor
140 pixel block
145, 146, 147 serial transistors
150 row drive circuit
160 detection circuit
161 CDS circuit
162, 166, 170 Switch
163 capacitor
164 comparator
165 ADC circuit
167 register
168 subtractor
180 output circuit
200 scintillator
301 imaging device
302 lens group
303 imaging element
304 signal processing circuit
305 monitor
306 memory

What is claimed is:

1. An image pickup device comprising:
an amplification transistor;
a photodiode configured to generate an electric charge and provide the electric charge to a first terminal of the amplification transistor;
a selection transistor having a first terminal electrically connected to a second terminal of the amplification transistor and a second terminal of the selection transistor electrically connected to a signal line, wherein a third terminal of the amplification transistor is electrically connected to a ground potential; and
a charge amount initialization unit configured to initialize a charge of the photodiode, wherein the charge amount initialization unit includes a photodiode reset transistor, wherein a first terminal of the photodiode reset transistor is electrically connected to the photodiode and a second terminal of the photodiode reset transistor is electrically connected to a supply of a fixed potential.

2. The image pickup device according to claim 1, further comprising a fixed current circuit configured to provide a fixed current to the signal line.

3. The image pickup device according to claim 2, further comprising a storage element arranged between the photodiode and a floating diffusion region.

4. The image pickup device according to claim 3, further comprising:
a first transfer transistor electrically connected to the photodiode and the storage element; and
a second transfer transistor electrically connected to the storage element and the floating diffusion region, wherein the storage element is a transistor.

5. The image pickup device according to claim 1, further comprising:
a floating diffusion region; and
a reset transistor, wherein the first terminal of the amplification transistor and a first terminal of the reset transistor are electrically connected to the floating diffusion region, and a second terminal of the reset transistor is electrically connected to the first terminal of the selection transistor and the second terminal of the amplification transistor.

6. The image pickup device according to claim 5, further comprising:
a transfer transistor, wherein a first terminal of the transfer transistor is electrically connected to the floating diffusion region and a second terminal of the transfer transistor is electrically connected to the photodiode.

7. The image pickup device according to claim 6, further comprising:
a second pixel circuit, the second pixel circuit including a second transfer transistor and a second photodiode, wherein a first terminal of the second transfer transistor is electrically connected to the floating diffusion region.

8. The image pickup device according to claim 5, wherein the reset transistor, the floating diffusion region, the selection transistor, and the amplification transistor are shared by at least two pixel circuits.

9. The image pickup device according to claim 1, wherein the first terminal of the amplification transistor is a gate, the second terminal of the amplification transistor is a drain, and the third terminal of the amplification transistor is a source.

10. An electronic apparatus comprising:
a lens; and
an image pickup device including:
an amplification transistor;
a photodiode configured to generate an electric charge and provide the electric charge to a first terminal of the amplification transistor;
a selection transistor having a first terminal electrically connected to a second terminal of the amplification transistor and a second terminal of the selection transistor electrically connected to a signal line, wherein a third terminal of the amplification transistor is electrically connected to a ground potential;
a storage element arranged between the photodiode and a floating diffusion region;
a first transfer transistor electrically connected to the photodiode and the storage element and
a second transfer transistor electrically connected to the storage element and the floating diffusion region.

11. A radiation detection apparatus comprising:
an image pickup device including:
an amplification transistor;
a photodiode configured to generate an electric charge and provide the electric charge to a first terminal of the amplification transistor;
a selection transistor having a first terminal electrically connected to a second terminal of the amplification transistor and a second terminal of the selection transistor electrically connected to a signal line, wherein a third terminal of the amplification transistor is electrically connected to a ground potential;
a storage element arranged between the photodiode and a floating diffusion region;
a first transfer transistor electrically connected to the photodiode and the storage element; and
a second transfer transistor electrically connected to the storage element and the floating diffusion region; and
a scintillator optically coupled to the image pickup device, wherein the scintillator converts radiation into visible light and the photodiode generates the electric charge based on the visible light.

12. A method for driving an image pickup device comprising:

accumulating charge at a photodiode during an exposure period;

initializing a gate voltage of an amplification transistor to an initial value by configuring a selection transistor to be in an ON state prior to an end of the exposure period;

reading a reset signal during the exposure period, the reset signal being output to a signal line through the selection transistor during a resetting of the photodiode;

reading, subsequent to the exposure period, an accumulation signal corresponding to the charge accumulated in the photodiode during the exposure period, wherein the charge is provided to the gate of the amplification transistor; and resetting the photodiode prior to a start of the exposure period by configuring the selection transistor, a reset transistor, and a transfer transistor to be in the ON state, wherein the selection transistor and the transfer transistor are simultaneously in the ON state for a portion of the exposure period.

13. The method of claim 12, further comprising configuring the selection transistor to be in an OFF state after the start of the exposure period and prior to the portion of the exposure period.

14. The method of claim 13, further comprising providing a fixed current to at least one of a drain and a source of the amplification transistor.

15. The method of claim 14, further comprising resetting a floating diffusion region during the exposure period.

16. The method of claim 15, further comprising transferring charge accumulated at the photodiode to the floating diffusion region prior to the end of the exposure period.

17. The method of claim 15, wherein the floating diffusion region, the selection transistor, and the amplification transistor are shared by at least two pixel circuits.

18. The method of claim 12, further comprising controlling a photodiode reset transistor to an OFF state prior to the start of the exposure period.

19. The method of claim 12, further comprising:
transferring the charge accumulated at the photodiode during the exposure period to a storage node through the transfer transistor; and
transferring the charge from the storage node to a floating diffusion region.

* * * * *